(12) United States Patent
Caldwell et al.

(10) Patent No.: US 12,388,266 B1
(45) Date of Patent: Aug. 12, 2025

(54) MOBILE DISTRIBUTED ENERGY RESOURCE TRANSPORT SYSTEM AND METHODS OF USE

(71) Applicant: Hyve Systems, Inc., Ojai, CA (US)

(72) Inventors: Chad James Caldwell, Ojai, CA (US); Anton Lesnicar, Herrsching (DE); Logan Nickolas Manning, Blue Springs, MO (US); Zachary Austin Garrett, Kansas City, MO (US); Manfred Magg, Friedberg (DE); Karl Stanley Kincheloe, Caldwell, ID (US)

(73) Assignee: Hyve Systems, Inc., Ojai, CA (US)

( * ) Notice: Subject to any disclaimer, the term of this patent is extended or adjusted under 35 U.S.C. 154(b) by 0 days.

(21) Appl. No.: 18/617,355

(22) Filed: Mar. 26, 2024

(51) Int. Cl.
*H02J 3/38* (2006.01)
*F25B 27/00* (2006.01)
*H02J 7/35* (2006.01)

(52) U.S. Cl.
CPC .............. *H02J 3/38* (2013.01); *F25B 27/002* (2013.01); *H02J 7/35* (2013.01); *H02J 2300/24* (2020.01)

(58) Field of Classification Search
CPC . H02J 3/38; H02J 7/35; H02J 2300/24; F25B 27/00; F25B 27/002
See application file for complete search history.

(56) References Cited

U.S. PATENT DOCUMENTS

| | | |
|---|---|---|
| 4,899,554 A | 2/1990 | Kato et al. |
| 5,623,105 A | 4/1997 | Liston et al. |
| 5,872,721 A | 2/1999 | Huston et al. |
| 6,230,363 B1 | 5/2001 | Kawai et al. |
| 6,776,003 B1 | 8/2004 | Bollen |
| 7,448,835 B1 | 11/2008 | Forrester, Jr. et al. |
| 7,726,496 B2 | 6/2010 | Heinrichs et al. |
| 7,739,965 B2 | 6/2010 | Heinrichs et al. |
| 8,177,463 B2 | 5/2012 | Walker |
| 8,459,911 B1 | 6/2013 | Kim et al. |
| 9,102,339 B2 | 8/2015 | Jensen |
| 9,233,791 B2 | 1/2016 | Bushnell et al. |
| 9,314,040 B2 | 4/2016 | Delele et al. |
| 9,664,420 B2 | 5/2017 | Bittner et al. |
| 9,702,610 B2 | 7/2017 | Iwasa et al. |
| 9,748,037 B2 | 8/2017 | Niizuma |
| 10,176,920 B2 | 1/2019 | Iwasa et al. |
| 10,377,563 B1 | 8/2019 | Childress et al. |

(Continued)

FOREIGN PATENT DOCUMENTS

| | | |
|---|---|---|
| WO | WO 2009/129900 | 10/2009 |
| WO | WO 2014/202167 | 12/2014 |

(Continued)

*Primary Examiner* — Robert L Deberadinis
(74) *Attorney, Agent, or Firm* — Norton Rose Fulbright US LLP

(57) ABSTRACT

The present disclosure includes a system for pre-cooling produce or other goods while transporting goods that includes a plurality of refrigerated containers that are electrically connected with one other to share power between the containers. In some aspects, each refrigerated container includes a plurality of photovoltaic panels, a battery configured to receive electrical power from the plurality of photovoltaic panels, and a refrigerator configured to cool a cavity of the container. In some aspects, the system includes an energy distribution system configured to determine a power level of the batteries for each container and, based on the power level, transfer power to or from the batteries.

20 Claims, 14 Drawing Sheets

(56) References Cited

U.S. PATENT DOCUMENTS

| | | |
|---|---|---|
| 11,064,709 B2 | 7/2021 | Goldman |
| 11,383,923 B2 | 7/2022 | Chen et al. |
| 2001/0035410 A1 | 11/2001 | Taube et al. |
| 2011/0265319 A1 | 11/2011 | Meyers |
| 2012/0181270 A1 | 7/2012 | Smith |
| 2015/0274415 A1 | 10/2015 | Farrar et al. |
| 2016/0282033 A1 | 9/2016 | Jorgensen et al. |
| 2017/0222598 A1 | 8/2017 | Campbell |
| 2021/0300674 A1 | 9/2021 | Baur et al. |
| 2022/0069766 A1 | 3/2022 | Mullings |
| 2022/0250833 A1 | 8/2022 | Nguyen |
| 2022/0376546 A1 | 11/2022 | Klepacki et al. |
| 2023/0016346 A1 | 1/2023 | Haring et al. |
| 2023/0192395 A1 | 6/2023 | Ikemiya |

FOREIGN PATENT DOCUMENTS

| | | |
|---|---|---|
| WO | WO 2015/115362 | 8/2015 |
| WO | WO 2020/227784 | 11/2020 |
| WO | WO 2021/062172 | 4/2021 |
| WO | WO 2022/094426 | 5/2022 |
| WO | WO 2022/228712 | 11/2022 |
| WO | WO 2023/283276 | 1/2023 |
| WO | WO 2023/052991 | 4/2023 |

MOBILE DISTRIBUTED ENERGY RESOURCE TRANSPORT SYSTEM AND METHODS OF USE

FIELD OF INVENTION

The present invention relates generally to transportation containers, and more specifically, to self-contained refrigerated transport containers.

BACKGROUND

Advancements in commercial shipping techniques have stagnated and often still employ the same components and methodologies that have been used for decades. For example, refrigerated transportation often requires the use of a vehicle that is specifically employed for transportation of refrigerated goods. Additionally, various refrigerated goods may be required to be placed in a single refrigerated environment that is cooled via an internal combustion engine or other environmentally damaging methods. These containers may also cease functioning if the transportation vehicle is turned off or breaks down. Further, conventional refrigerated containers are limited in controlling the internal temperatures and include other inefficiencies that contribute to high operational costs and extensive environmental impacts. The cold chain transportation system is built around a rectangular box with one point of entry. In order to remove contents from the rolling stock, e.g., the trailer, it must be unloaded into a building in order to maintain cold chain, resulting in hours long delays for trucks and drivers waiting to get a door at a cold storage warehouse.

SUMMARY

The present systems and methods provide improved shipping containers and more specifically, refrigerated containers. The system can include multiple containers that may be independently controlled based on the good that is to be transported so that all goods may be maintained at an optimal temperature range during transport. The containers can be distinct from the vehicle and may be configured to continue to be independently controlled after transport during permanent or temporary storage, such as in a parking lot or warehouse. Further, the present systems can be powered via renewable resources. In some configurations, the present containers can provide independent energy generation and power sharing among other containers that enable continued cooling in the event of a failure of an external power source or a power source of one of the containers.

One general aspect of the present disclosure includes a system for pre-cooling and transporting goods. The system can include a refrigerated container defining a cavity configured to store goods for transport; a plurality of photovoltaic panels coupled to an outer surface of the container; one or more batteries configured to receive electrical power from the plurality of photovoltaic panels; an energy distribution system connected to the one or more batteries and a first energy source. In some aspects, the energy distribution system includes a controller configured to: based on a power level of the one or more batteries being less than or equal to a first threshold, transfer power from the first energy source to the one or more batteries; and based on a power level of the first energy source being less than or equal to a second threshold, transfer power from the one or more batteries to the first energy source. Some systems can include one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. Some aspects include corresponding computer systems, apparatus, and computer programs recorded on one or more computer storage devices, each configured to perform the actions of the methods.

Implementations may include one or more of the following features. The system where the first energy source includes a second container defining a cavity configured to store goods for transport, the second container having: a plurality of photovoltaic panels coupled to at least a first side and a second side of an outer surface of the second container; and one or more batteries configured to receive electrical power from the plurality of photovoltaic panels of the second container. The energy distribution system includes a generator configured to generate power, the generator connected to the one or more batteries and the first energy source. The energy distribution system can be configured to transfer power to the one or more batteries via induction. In some aspects, the container includes a power transfer system coupled to a bottom side of the container. In some aspects, the energy distribution system includes a base configured to receive the container such that when the bottom side of the container is coupled to the base the energy distribution system is configured to wirelessly charge the one or more batteries. The base can be configured to be disposed on a chassis of a vehicle or stationary structure; and the base may be configured to couple to the vehicle or stationary structure in multiple different orientations.

In some aspects, the system may include a refrigerator configured to cool the cavity, the refrigerator being configured to receive power from the one or more batteries. The refrigerator can include a first duct disposed underneath a floor of the container that defines a passage extending between a first opening positioned adjacent to a first wall of the container and a second opening positioned adjacent to a second wall of the container. Additionally, or alternatively, the refrigerator can include a second duct disposed underneath the floor of the container that defines a passage extending between a first opening positioned adjacent to the first wall of the container and a second opening positioned adjacent to the second wall of the container. In some configurations, the refrigerator includes: a first fan disposed in the first duct and configured to transport cold air into the cavity via the first and second openings of the first duct; and a second fan disposed in the second duct and configured to transport cold air into the cavity via the first and second openings of the second duct. The first and second fans can be bi-directional fans. In some embodiments, there may be two or more fans in each duct alternating the direction of airflow, with one fan running, shutting off, followed by the other fan activating and blowing air in the reverse direction.

In some aspects, a width of the container and a length of the container can be between 96 and 102 inches. The container can include: a first wall and a second wall; a first slidable door covering a first doorway defined by a first side of the container; and a second slidable door covering a second doorway defined by a second side of the container. In some aspects, the container includes a first door track coupled to the first wall, where the first slidable door is configured to traverse the first door track to move between an open position in which the cavity is accessible via the first doorway and a closed position. The first door track may include a first portion extending in a direction that is substantially parallel to a roof of the container and a second portion extending in a direction that is substantially parallel to the first wall. In some aspects, the first slidable door is disposed on the first portion of the first door track when in the open position and the first slidable door is disposed on the second portion of the first door track when in the closed position. In at least some configurations, the first and second slidable doors can be positioned in the closed position simultaneously such that both the first and second doorways can be accessible at the same time. The container may include a sensor configured to detect carbon dioxide, oxygen and ethylene gas levels and perform one or more functions based on the gas levels. As a non-limiting example, based on the carbon dioxide, oxygen and ethylene gas levels being above a first threshold, the container (or controller thereof) can actuate a gas source to transfer a gas into or out of the cavity. Implementations of the described techniques may include hardware, a method or process, or computer software on a computer-accessible medium.

One general aspect includes a system for transporting goods a plurality of refrigerated containers, where each container defines a cavity configured to pre-cool produce and store goods for transport. The containers can include: a plurality of photovoltaic panels coupled to an outer surface of the container; a battery configured to receive electrical power from the plurality of photovoltaic panels; a refrigerator configured to cool the cavity. The system can include an energy distribution system connected to the plurality of refrigerated containers and configured to: determine a power level of the batteries for each container; determine a required cooling load capacity; and based on a the power level of the battery and required cooling load capacity of a first container of the plurality of refrigerated containers being below a first threshold, transfer power to the battery of a first container from at least one of the batteries of the other plurality of refrigerated containers. Some aspects include corresponding computer systems, apparatus, and computer programs recorded on one or more computer storage devices, each configured to perform the actions of the methods.

Implementations of the described configurations may include one or more of the following features. The energy distribution system can include a power grid configured to receive and transfer power to each battery of the plurality of refrigerated containers. In some aspects, the energy distribution system is configured to: transfer power from the battery of a second container of the plurality of refrigerated containers to the power grid based on the power level of the battery of the second container being above a second threshold; and transfer power from the power grid to the battery of a third container of the plurality of refrigerated containers based on the power level of the battery of the third container being below the first threshold. The energy distribution system can be configured to: operate the plurality of refrigerated containers in a first mode in which energy generated by the plurality of photovoltaic panels is transferred to the battery of a respective container of the plurality of refrigerated containers; and operate the plurality of refrigerated containers in a second mode in which energy generated by the plurality of photovoltaic panels is transferred to the power grid. The system can be configured to switching operation of the first container from the first mode to the second mode based on the power level of the battery of a first container being above a second threshold. In some aspects, the energy distribution system includes a generator connected to the power grid and configured to generate electrical energy. The energy distribution system may include a base station coupled to the power grid, the base station including a plurality of charging interfaces configured to wirelessly transfer electrical energy between the power grid and the plurality of refrigerated containers. The energy distribution system and the plurality of refrigerated containers can be disposed on a vehicle.

Implementations of the described techniques may include hardware, a method or process, or computer software on a computer-accessible medium.

One general aspect includes a system for transporting goods. The system can include a container defining a cavity configured to store goods for transport, the container including a base defining a first and second passage each configured to receive a fork of a forklift; a plurality of photovoltaic panels coupled to an outer surface of the container; one or more batteries configured to receive electrical power from the plurality of photovoltaic panels; an energy distribution system connected to the one or more batteries and a first energy source. The energy distribution system can include a base station having one or more electrical interfaces configured to transfer power between the one or more batteries and the first energy source. In some aspects, the container is coupled to the base station via a locking mechanism. In some configurations, a plurality of sensors are coupled to the container and configured to determine an entrance amount that the fork extends within at least one of the first and second passage. A controller can be configured to disengage the locking mechanism based on the entrance amount being greater than or equal to a first threshold. Some aspects include corresponding computer systems, apparatus, and computer programs recorded on one or more computer storage devices, each configured to perform the actions of the methods.

Implementations may include one or more of the following features. A first sensor, a second sensor, and a third sensor configured to monitor the first passage; the first sensor being nearer a first opening of the first passage than the second and third sensor and the second sensor being nearer the first opening than the third sensor. A controller can be configured to operate the locking mechanism in a first orientation state based on actuation of the first sensor before the second sensor. In some aspects, a controller is configured to switch the locking mechanism between an idle state and an activated state based on actuation of the second sensor. In some aspects, when the locking mechanism is operating in the first orientation state, the controller is configured to actuate the locking mechanism based on actuation of the third sensor. Additionally, or alternatively, when the locking mechanism is operating in the second orientation state, the controller is configured to actuate the locking mechanism based on actuation of the first sensor. Implementations of the described techniques may include hardware, a method or process, or computer software on a computer-accessible medium.

The term "coupled" is defined as connected, although not necessarily directly, and not necessarily mechanically; two items that are "coupled" may be unitary with each other. The terms "a" and "an" are defined as one or more unless this disclosure explicitly requires otherwise. The term "substantially" is defined as largely but not necessarily wholly what is specified (and includes what is specified; e.g., substantially 90 degrees includes 90 degrees and substantially parallel includes parallel), as understood by a person of ordinary skill in the art. In any disclosed configuration, the term "substantially" may be substituted with "within [a percentage] of" what is specified, where the percentage includes 0.1, 1, 5, and 10 percent.

Further, an apparatus or system that is configured in a certain way is configured in at least that way, but it can also be configured in other ways than those specifically described.

The terms "comprise" (and any form of comprise, such as "comprises" and "comprising"), "have" (and any form of have, such as "has" and "having"), and "include" (and any form of include, such as "includes" and "including") are open-ended linking verbs. As a result, an apparatus that "comprises," "has," or "includes" one or more elements possesses those one or more elements but is not limited to possessing only those elements. Likewise, a method that "comprises," "has," or "includes" one or more steps possesses those one or more steps but is not limited to possessing only those one or more steps.

Any configuration of any of the apparatuses, systems, and methods can consist of or consist essentially of—rather than comprise/include/have-any of the described steps, elements, and/or features. Thus, in any of the claims, the term "consisting of" or "consisting essentially of" can be substituted for any of the open-ended linking verbs recited above, in order to change the scope of a given claim from what it would otherwise be using the open-ended linking verb. Further, any component described herein as being singular is not limited as being a single component but should be inclusive of multiple components, unless expressly indicated otherwise or indicated otherwise by context. For example, a battery, described herein, can include multiple batteries operating in conjunction. As another example, a controller configured to perform an operation also includes multiple controllers operating together to perform that operation. Herein, "or" is inclusive and not exclusive, unless expressly indicated otherwise or indicated otherwise by context, and can have the same meaning as "and/or." Therefore, herein, "A or B" means "A, B, or both," unless expressly indicated otherwise or indicated otherwise by context.

The feature or features of one configuration may be applied to other configurations, even though not described or illustrated, unless expressly prohibited by this disclosure or the nature of the configurations.

Some details associated with the configurations described above and others are described below.

BRIEF DESCRIPTION OF THE DRAWINGS

The following drawings illustrate by way of example and not limitation. For the sake of brevity and clarity, every feature of a given structure is not always labeled in every figure in which that structure appears. Identical reference numbers do not necessarily indicate an identical structure. Rather, the same reference number may be used to indicate a similar feature or a feature with similar functionality, as may non-identical reference numbers. The figures are drawn to scale (unless otherwise noted), meaning the sizes of the depicted elements are accurate relative to each other for at least the configuration depicted in the figures.

DETAILED DESCRIPTION

Figure 1A:
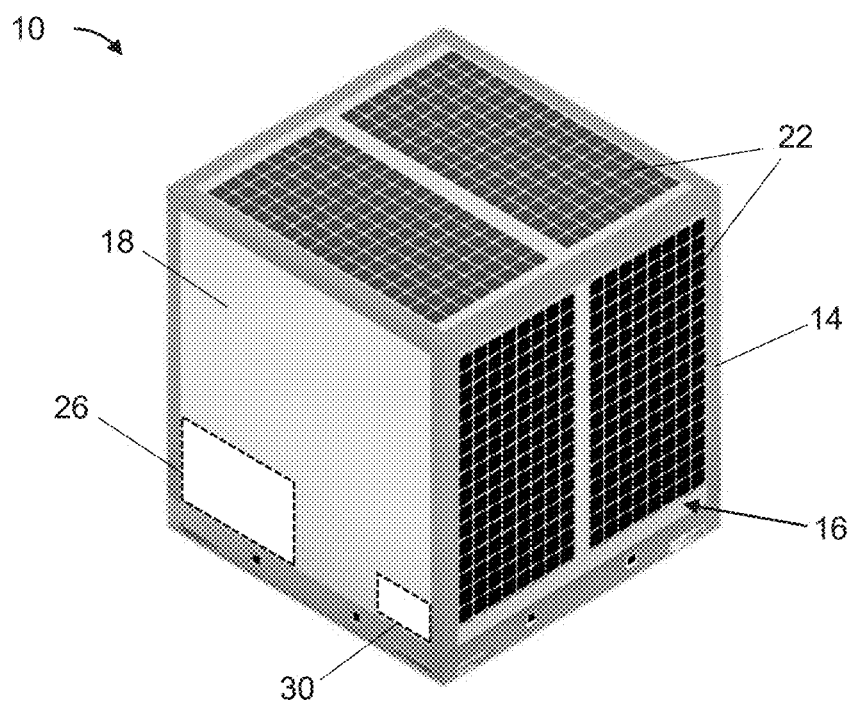
FIG. 1A shows a perspective view of a system according to an embodiment of the present disclosure having a first container.
Figure 1B:
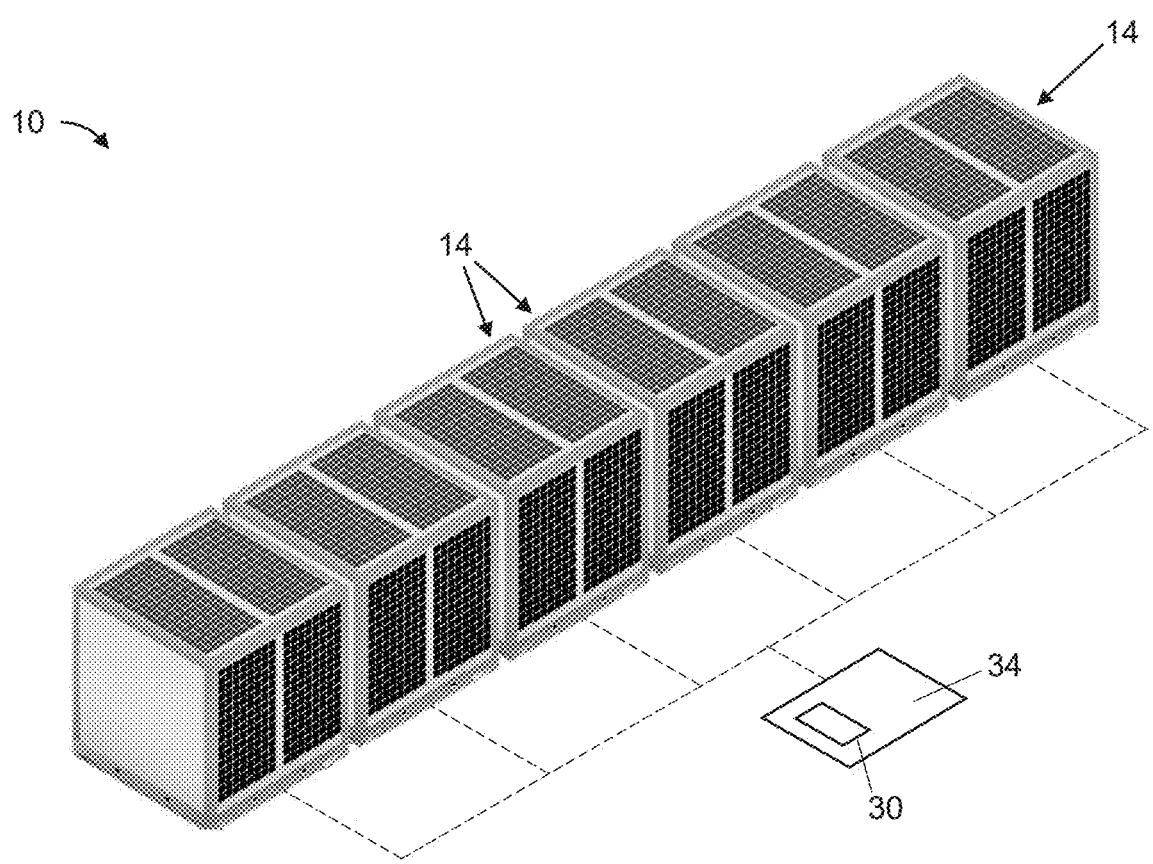
FIG. 1B shows a perspective view of a system according to an embodiment of the present disclosure having a plurality of containers.

Referring now to the drawings, and more particularly to FIGS. 1A and 1B, shown therein and designated by the reference numeral 10 is a system for transporting goods. As shown in FIG. 1A, system 10 includes at least one container 14 configured to store goods for transport. As will be described in more detail below, container 14 includes a plurality of walls 16 and at least one door 18 that is movable to access a cavity (e.g., 38) of the container. In some configurations, system 10 can include a power generation source. For example, container 14 can include or be coupled to a plurality of photovoltaic panels 22. In the configuration depicted in FIG. 1A, photovoltaic panels 22 can be coupled to an outer surface of container 14. The photovoltaic panels 22 can be coupled to both stationary portions of container 14 (e.g., roof or sidewall) or movable portions (e.g., door) of the container.

In some configurations, system 10 can include a power storage unit. For example, container 14 can include or be coupled to at least one battery 26. In some configurations, battery 26 is configured to receive electrical power from photovoltaic panels 22 or other power source. System 10, container 14, or both, can include a controller 30 having a processor and memory operable to perform one or more of the functions described herein. For example, controller 30 may be configured to control the flow of power from photovoltaic panels 22, battery 26, or both.

As shown in more detail in FIG. 1B, system 10 may include an energy distribution system 34 that is configured to be connected to battery 26 of container 14. Energy distribution system 34 is configured to transfer electricity between one or more components of container 14 (e.g., battery 26, photovoltaic panels 22, or other components) and an external source (e.g., one other container, electrical power storage unit, power generation source, or the like). In some configurations, each container 14 is coupled to one or more other container via a power bus (e.g., wire) such that the containers are configured to share energy between one another, or other loads connected to the power bus. In some configurations, energy distribution system 34 can include or be coupled to an electrical grid (e.g., via the power bus and bi-directional grid tied inverter). Although described in more detail herein, each container 14 may be connected with energy distribution system 34 via a wired or wireless interface as is known in the art.

In configurations in which system 10 includes a plurality of containers 14, energy distribution system 34 can be coupled to each container and configured to transfer power between the containers (e.g., between the batteries 26 of each container). In some configurations, energy distribution system 34 (or controller 30 thereof) may be configured to transfer power to battery 26 of a first container (e.g., 14) based on a power level of that battery being less than or equal to a minimum power threshold. Additionally, or alternatively, energy distribution system 34 (or controller 30 thereof) may be configured to transfer power from the battery of the first container based on the power level of that battery being greater than or equal to a reserve power threshold. In some configurations, the power transferred to/from the battery of the first container is received/sent from a battery of a second container (e.g., 14) or from respective batteries of multiple other containers (e.g., 14). Additionally, or alternatively, power may be transferred between the containers and separate power storage unit (e.g., reserve battery), a power generation source (e.g., generator), or the like.

Figure 2A:
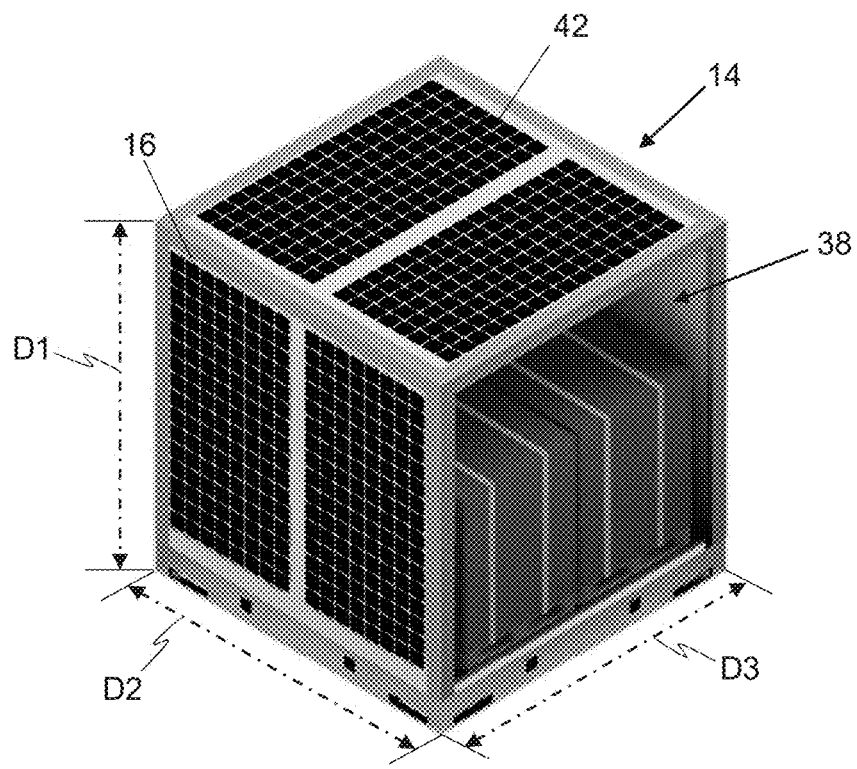
FIG. 2A shows a perspective view of an example of a container of the present systems.
Figure 2B:
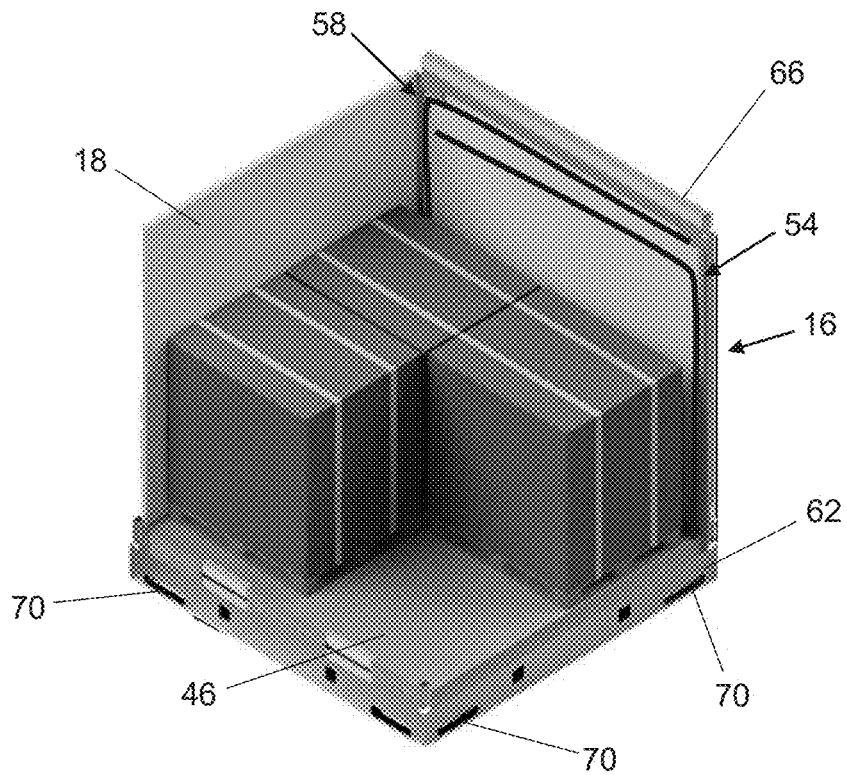
FIG. 2B shows a partial view of FIG. 1A with an exterior portion of the container omitted.
Figure 3:
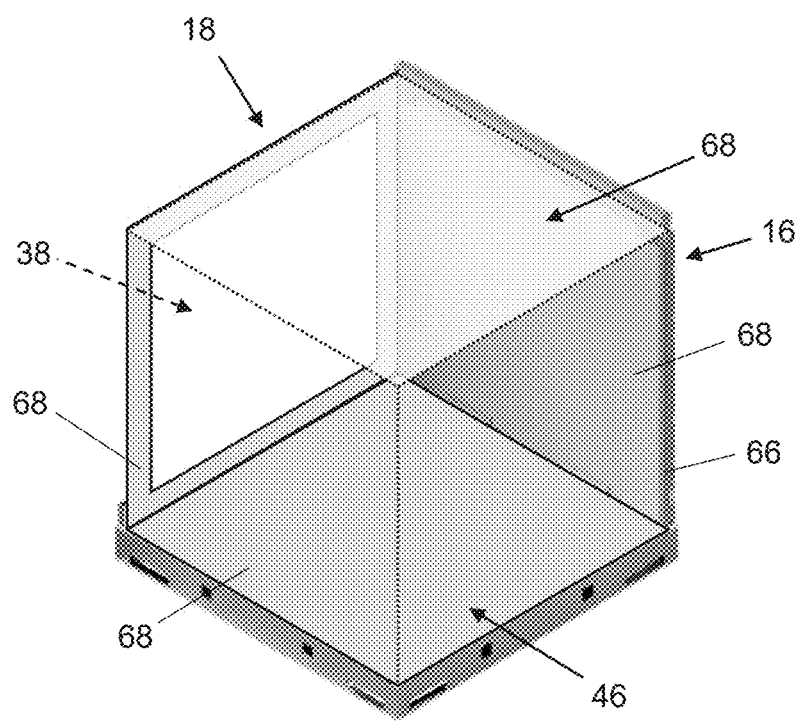
FIG. 3 shows a perspective view of an example of a container of the present systems.

Referring now to FIGS. 2A and 2B, shown is an example of container 14 that includes one or more walls 16, one or more doors 18, a roof 42 and a floor 46. Each of wall 16, door 18, roof 42, or floor 46 can include an insulation panel (e.g., 68 in FIG. 3), photovoltaic panel 22, or both, as described in more detail below. In some configurations, photovoltaic panels 22 can be placed on at least three sides of container 14, such as both walls 16 and roof 42, although other arrangements can be used. Photovoltaic panels 22 may be peel and stick flexible solar modules, such as those commercially available from Merlin Solar Technologies, Inc. In an illustrative example, each face (e.g., wall 16 or roof 42) can include multiple (e.g., greater than or equal to 2, 3, 4, 5, 6, 7, 8, or 10) solar modules wired in series or parallel.

As shown herein, container 14 can be a rectangular prism (e.g., cube) that includes a first wall, a second wall that is opposite the first wall, a first door, and a second door that is opposite the first door. In some configurations, container 14 can be cube-shaped, such that a height D1, a width D2, and a length D3 of the container are each within 20% (e.g., within 15, 12, 10, 7, 5, 3 or 1%) of one another or are equal. Additionally, or alternatively, container 14 can include a cube-shaped cross-section such that width D2 and length D3 of container are within 10% (e.g., within 7, 5, 3 or 1%) of one another or are equal. As a specific non-limiting example, height D1 can be less than or equal to 114 inches (e.g., between 102 and 114 inches, such as from 108 to 114 inches). Additionally, or alternatively, width D2 and length D3 can be equal to or between any two of 96, 98, 100, or 102 inches. In some of the described configurations, container 14 is sized to accommodate four standard sized pallets (e.g., 48×40 inches) with the longitudinal axis of the pallet oriented perpendicular to door 18.

As shown in FIG. 2A, container 14 is shown in which a first door (e.g., 18) is in an open position such that a cavity 38 of the container is accessible via a doorway to handle shipping packages. As depicted, door 18 is configured to be movable between an open position (FIG. 2A) and a closed position (FIG. 1A). Referring now to FIG. 2B, container 14 can include a first door track 54, a second door track 58, or both as shown in FIG. 2B. The first door (e.g., 18) is configured to traverse first door track 54 to move between the open and closed positions and the second door (e.g., 18) is configured to traverse second door track 58 to move between the open and closed positions. As depicted, first and second door tracks 54, 58 can be overhead doors that include a first portion extending in a direction that is substantially parallel to roof 42 of container 14 and a second portion extending in a direction that is substantially parallel to wall 16 of the container. In such configurations, when doors 18 are in the open position, the doors nest one above the other in the upper most part of cavity 38 of container 14. Alternatively, doors 18 may be configured to move in other slidable manners such as a roll-up door or, alternatively, via another movement such as a hinged door.

Referring now to FIG. 2B, container 14 may include a base 62 and a frame 66 extending from the base and configured to support walls 16, doors 18, or both. Base 62 can include one or more openings 70 configured to assist in moving container 14. For example, as shown in FIG. 2B, a first side of base 62 can define a pair of openings 70 that are configured to receive a respective fork of a forklift. In this way, and others, container 14 can is movable between locations, such as a transportation vehicle and ground storage.

Figure 2C:
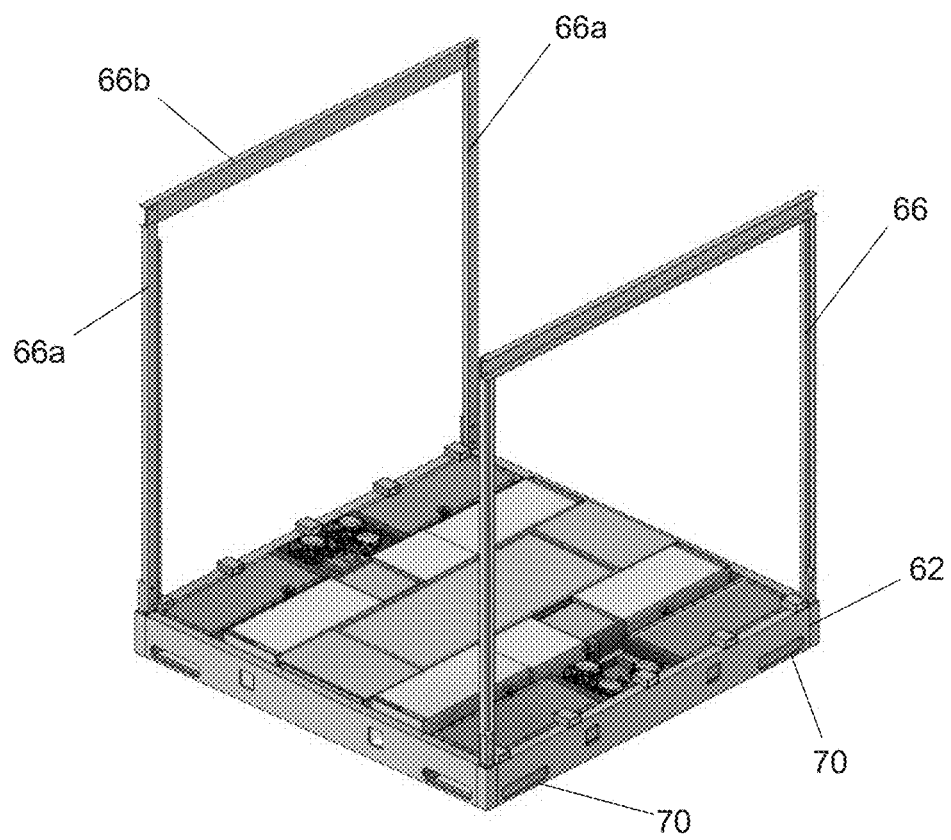
FIG. 2C shows a partial view of FIG. 1A with the walls, doors, and floor of the container omitted.

Referring now to FIG. 2C, shown is a configuration in which walls and doors are omitted. As shown, frame 66 can be U-shaped. For example, frame 66 may include multiple (e.g., two) vertical members 66a that are connected by a horizontal member 66b. Vertical members 66a can extend from a corner of base 62 and can be shaped to be received by or within the base. Vertical member 66a, horizontal member 66b, and base 62 can be connected via any suitable means, such as via friction fit, fasteners (e.g., screws, bolts, etc.), pins, welding, rivets, flanges, combination thereof, or the like. In some configurations, frame 66 can at least partially surround wall 16. In some configurations, container 14 can include two frames (e.g., 66) extending from opposing sides of a base 62 the container. Base 62 and frame 66 may include a metal, metal alloy, or other suitable material. As described in more detail below with respect to FIGS. 6-8E, floor 46 (omitted in FIG. 2C) can cover one or more components that are disposed within base 62.

FIG. 3A depicts an example of container 14 showing a plurality of insulative panels 68. As shown, each of side (e.g., wall 16, door 18, roof 42, and floor 46) of container 14 can include or be coupled to insulative panel 68. At least some panels 68 may extend along substantially along an entirety of a side (e.g., wall 16, roof 42, and floor 46) of container 14. Alternatively, some panels 68 may be shaped based in different manners to accommodate ducting, doorways, or other features described herein. For example, one panel (e.g., 68) configured to be positioned on door 18 can define an opening that corresponds to a doorway for accessing cavity 38. In some configurations, panels 68 can include a suitable insulative material, such as a polyethylene resin injected with a polyurethane foam. Further, although described herein as being distinct, in some configurations, panels 68 can correspond to one or more of wall 16, roof 42, or floor 46.

Panels 68 can be configured to allow for easy assembly and disassembly of container 14. As an illustrative example, a method of assembling container 14 may include inserting one or more first panel (e.g., 68) to define or cover any ducting within base 62, inserting a second and third panel (e.g., 68) on wall 16, and inserting a fourth panel on floor 46. In some methods, door 18 can then be installed and fifth and sixth panels (e.g., 68) can be inserted over the door to define door frames. A seventh panel (e.g., 68) can then be installed on roof 42. In some configurations, the panels 68 can be positioned such that they create a watertight seal with one another. Additionally, or alternatively, each panel 68 may be configured such that it can be stored within container 14 when disassembled. For example, panels 68 can be stacked on floor 46 without extending past base 62 or frame 66. In this way, and others, containers 14 can be transported in assembled or disassembled states.

Figure 4A:
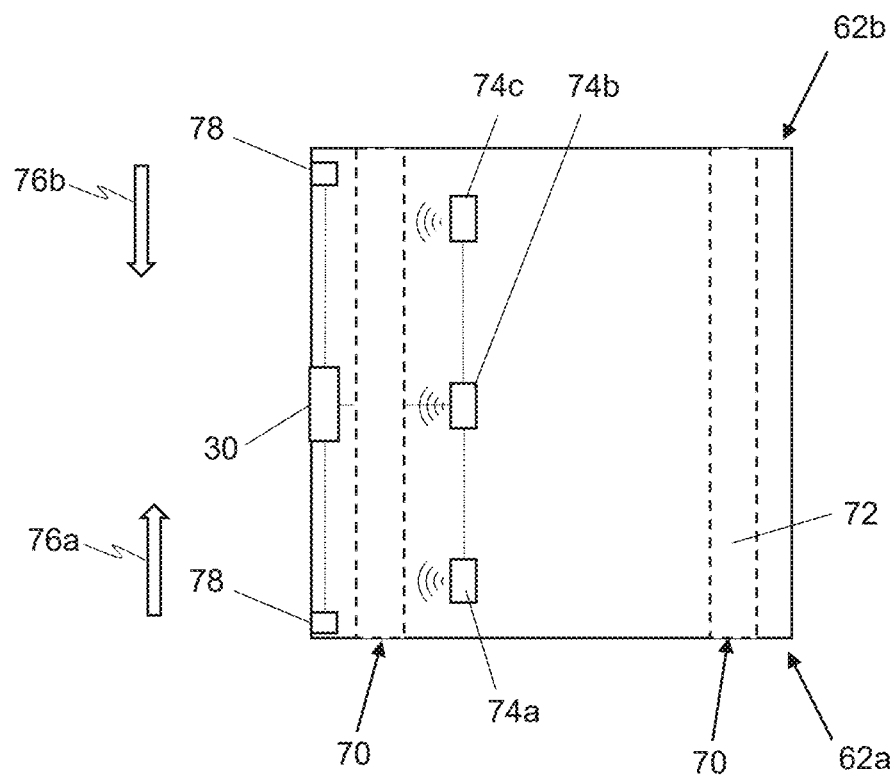
FIG. 4A shows a schematic view of an example of a base assembly of a container of the present systems.

Referring now to FIG. 4A, shown is a schematic example of container 14 having a locking system. In the depicted non-limiting configurations, the locking system can be integrated into base 62 that includes a pair of openings 70 that define a passage 72 for receiving forks of a forklift. The locking system may include a plurality of sensors 74 configured to detect an object within passage 72 and one or more locking mechanisms 78 configured to secure the base to a structure (e.g., chassis or bed of a vehicle or other support station). In some configurations, sensors 74 are configured to determine an entrance amount that a fork of a forklift extends within at least one of passages 72 defined by the pair of openings 70. Each of sensors 74 and locking mechanisms 78 can be in communication with controller 30 and the locking mechanisms can be actuated based on the transmission of signals from one of the sensors. For example, sensors 74 can sense when forklift forks enter the passages 72 and cause an actuator to lock or unlock locking mechanisms 78 that secure container 14. In one configuration, controller 30 can actuate locking mechanisms 78 based on the entrance amount being greater than or equal to a first threshold. Locking mechanisms can secure base 62 to another object in any suitable manner and may include movable hooks, rods, latches, levers, screws, springs, pressurized equipment, or any other known electrically actuated lock or actuator (e.g., linear, rotary, hydraulic equipment, or the like).

To further illustrate, the locking system can include a first sensor 74a, second sensor 74b, and third sensor 74c coupled to base 62 and configured to monitor a first passage (e.g., 72). The first sensor 74a may be positioned nearer to a first side 62a of the base that defines a first opening (e.g., 70) than the second or third sensors 74b, 74c. And second sensor 74b can be positioned nearer to first side 62a of the base than third sensor 74c. Controller 30 can perform one or more functions based on the timing of sensors 74. For example, controller 30 can determine which side of container 14 a fork truck is approaching the container. To further illustrate, if a fork enters through passage 72 in a first direction 76a (e.g., via openings on first side 62a of the base), then first sensor 74a will detect the fork before second sensor 74b and third sensor 74b. Alternatively, if the fork enters passage in a second direction 76b (e.g., via openings 70 in second side 62b of the base), then the third sensor 74c will detect the fork before the second sensor 74b. In this way, controller 30 can operate knowing the position of a fork truck relative to container 14.

In some such configurations, container 14 (e.g., via controller 30) is configured to actuate locking mechanisms 78 based on detection of an object via sensors 74. For example, controller 30 may operate locking mechanisms 78 in various states, such as an idle state in which the locking mechanisms are off, in a sleep mode, or a low power mode; an activated state in which the locking mechanisms are on or transmitting information to the controller; a locked state in which the locking mechanisms are configured to be engaged with another object to secure container 14 to the object; a released state in which the locking mechanisms are configured to be disengaged or detached from another object, or combination thereof. In one configuration, controller 30 can actuate locking mechanisms 78 between states based on a sequence of detection of sensors 74, a time between detection of the sensors, or combination thereof. In an illustrative example, controller 30 can actuate locking mechanisms 78 to the released state based on sequential detection of an object by first sensor 74a, then second sensor 74b, then third sensor 74c within a predefined time. Additionally, or alternatively, controller 30 can actuate locking mechanisms 78 to the activated state based on detection of a single sensor (e.g., second sensor 74b) or detection of multiple sensors (e.g., first sensor 74a then second sensor 74b or third sensor 74c then second sensor). In some configurations, controller 30 may operate locking mechanisms 78 in different orientation states based on the timing of signals from sensors (e.g., operating in a first orientation state based on first sensor being activated before second sensor). In this way and others, system 10 can determine a relative direction of a forklift compared to container and a distance that the fork extends within the passages of base 62. Such configurations can improve efficiency, safety, and security by preventing accidental disengagement of locking mechanism (e.g., due to miscellaneous objects or other contaminants entering passage) and only engaging or turning on locking mechanisms based on specific operational parameters established by a user.

Figure 4B:
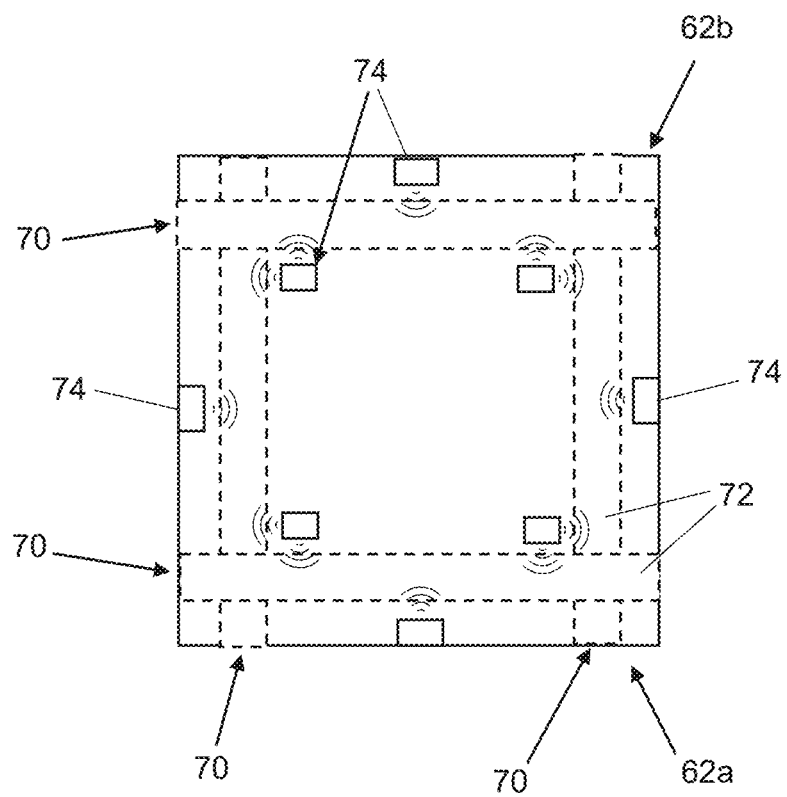
FIG. 4B shows a schematic view of another example of a base assembly of a container of the present systems.
Figure 4C:
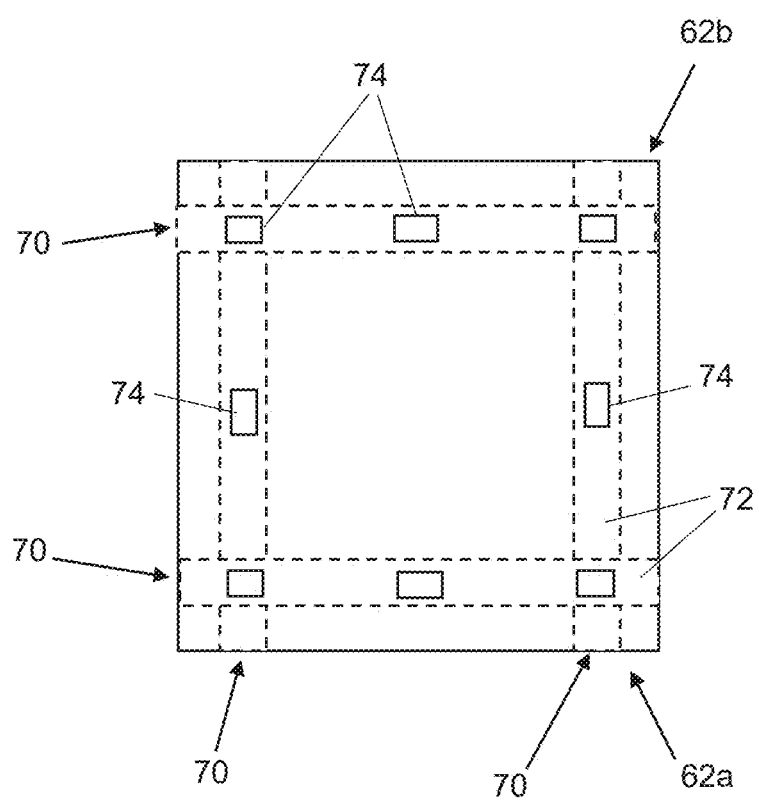
FIG. 4C shows a schematic view of a further example of a base assembly of a container of the present systems.

For the sake of brevity, only a few illustrative operational states of the locking system are described herein. However, it should be understood that the locking system can include any number of sensors 74 and locking mechanisms 78 to secure container 14 to another object. Another illustrative example is shown in FIG. 4B in which multiple sensors 74 are used to detect objects within four passages 72. In other configurations, more or less sensors 74 can be used (e.g., between two and twenty sensors) and different sequences or thresholds can be established to actuate locking mechanisms 78 based on the sensors. To further illustrate, a plurality of sensor (e.g., 74) can line a passage (e.g., 72) and controller 30 can actuate locking mechanisms 78 based on a threshold being met, such as a specific number of or percentage of sensors detecting a fork. Yet another illustrative example is shown in FIG. 4C in which multiple sensors 74 are used to detect objects within four passages 72.

Figure 5A:
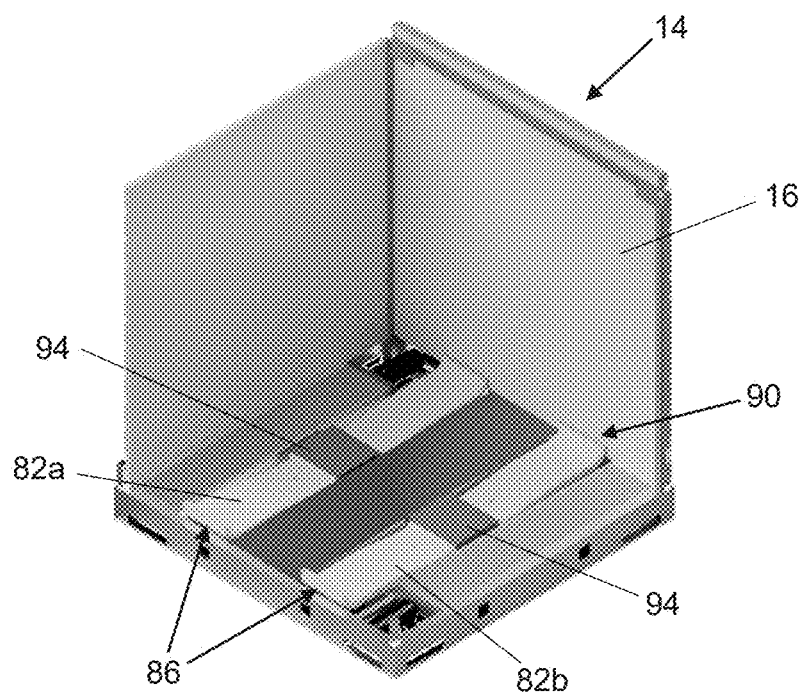
FIGS. 5A and 5B show partial perspective views of an example of a container of the present systems in a static state and a refrigerated state, respectively.
Figure 5B:
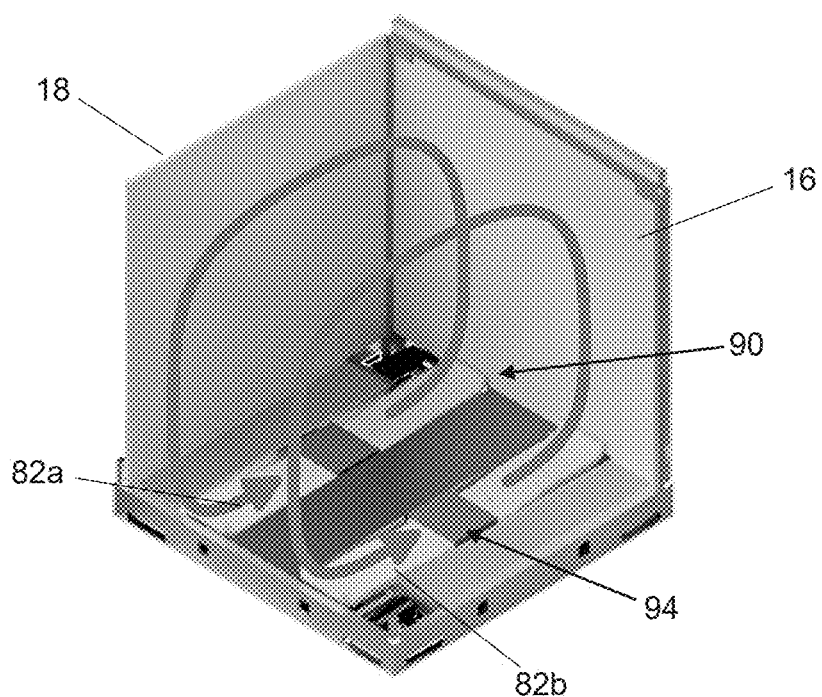

Referring now to FIGS. 5A and 5B, shown is an example of container 14 that includes a refrigeration system that is configured to cool cavity 38 and maintain a temperature of the cavity below the environmental temperature. In some configurations, the refrigeration system can be integrated with base 62 and can include one or more ducts. As depicted in FIGS. 5A and 5B, the refrigeration system can include a first duct 82a and a second duct 82b positioned beneath floor 46 of container 14. Each duct can define a passage extending between a first opening 86 positioned adjacent to a first wall (e.g., 16) of the container and a second opening 90 positioned adjacent to a second wall (e.g., 16) of the container. In some configurations, first duct 82a, second duct 82b, or both, or additional ducts may extend vertically along walls 16. In some such configurations, the ducts can be secured to wall 16 or disposed within the walls to deliver air to cavity 38 or deliver air to the refrigeration system.

In some configurations, first duct 82a and second duct 82b can operate independently and may each include separate refrigeration units 94 or otherwise be configured to enable the first and second ducts to operate as independent loops or in different operational states. In some such configurations, system 10 (e.g., via controller) can control the operation of the refrigeration system (e.g., refrigeration units 94) to cool cavity 38 and maintaining a cavity temperature. For example, controller may control a refrigeration unit (e.g., 94) of first duct 82a to operate in a defrost mode and control a refrigeration unit (e.g., 94) of second duct 82b to operate in a cooling mode. In some configurations, refrigeration unit 94 can include a bi-directional fan that may expel air in two directions. The bi-directional fan can be mounted vertically such that the blades of the fan extend in a direction perpendicular parallel to the walls 16. In some configurations, bi-directional fan can operate in a first mode to deliver air through the ducts (e.g., 82a, 82b) and through walls 16 of container 14 and a second mode to receive air through the walls of the container. In this way, and others, walls 16 can function as a supply plenum as well as a return plenum depending on the direction of the fan, as illustrated in FIG. 5B.

Figure 6:
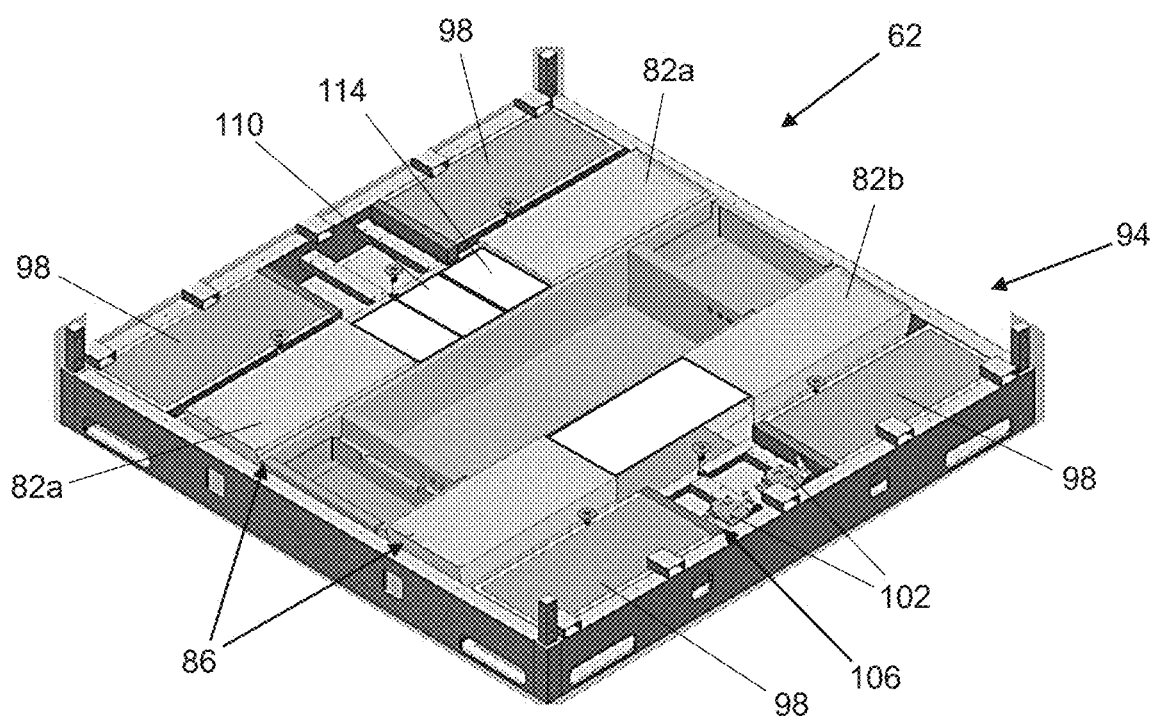
FIG. 6 shows a perspective view of an example of a base assembly of a container of the present systems.

In some configurations, refrigeration units 94 can include typical configuration circuitry, such as a compressor, condenser, expansion device, and evaporator. FIG. 6 shows an illustrative non-limiting example, of refrigeration system that includes a plurality of condensers 98, a plurality of compressors 102, expansion valve 106, evaporator coils 110, and a fan 114. In some such configurations refrigeration system includes compressor 102 (e.g., scroll compressor) having a refrigerant line on the outlet side of the compressor that runs to condenser coils (e.g., 98) that are mounted above condenser fans which pull air through the coils and expel warm air out of the bottom of container 14 (e.g., via openings in passage 72 and around the edge of base 62). Continuing the example, the refrigerant can proceed to expansion valve 106 where the liquid expands into a gas and then proceeds through the evaporator coils 110. In some configurations, fan 114 (e.g., bi-directional fan) can transfer air over evaporator coils 110 to cool the air and then deliver that cooled air into cavity (e.g., 38) of container 14.

Figure 7A:
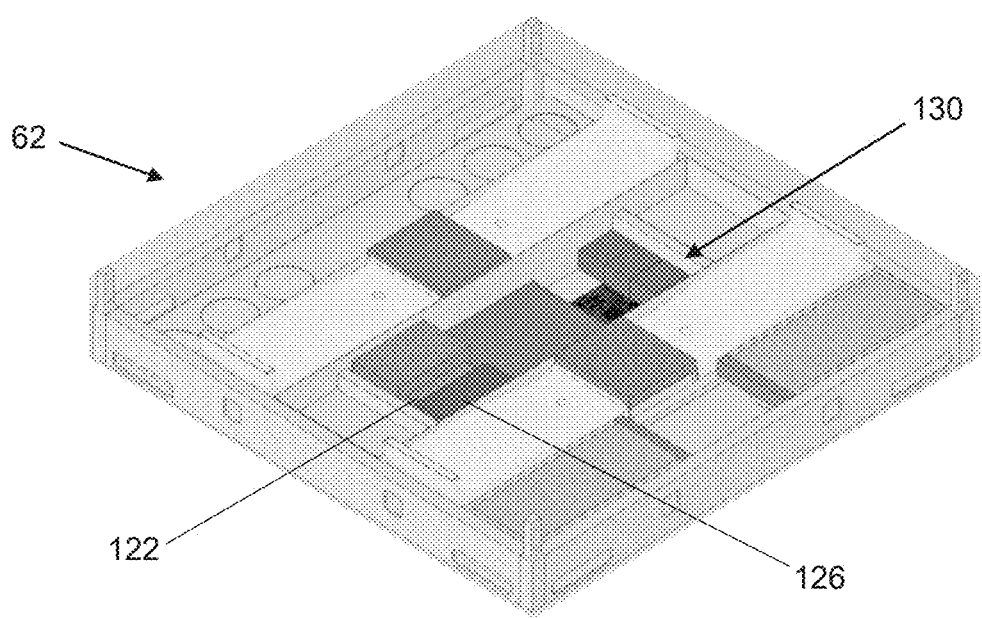
FIGS. 7A and 7B show perspective and top views, respectively, of an example of a base assembly of a container of the present systems.
Figure 7B:
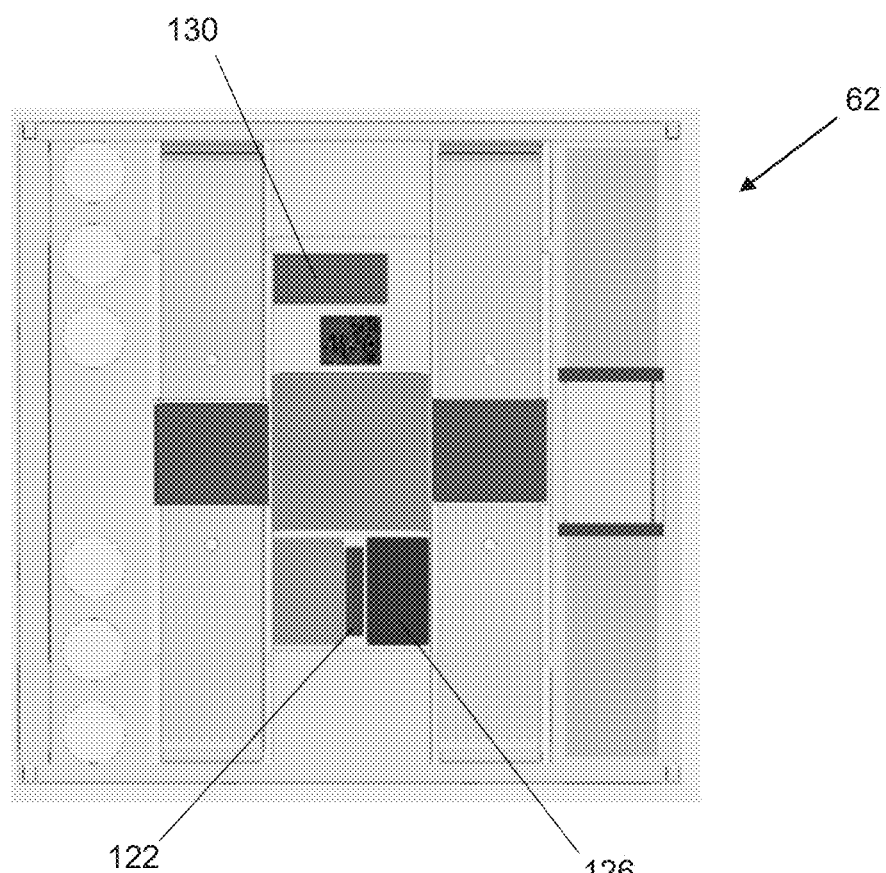

Referring now to FIGS. 7A-7B, shown are various views of an example of energy distribution system 34 coupled to base assembly 62. As shown, energy distribution system 34 can include an inverter (e.g., 118 in FIG. 8B), a converter 122, a variable frequency drive 126, a maximum power point tracking (MPPT) device 130, or combination thereof. Each of the components of energy distribution system 34 can be configured to cooperate with one another to perform the functions described here, such as energy generation (e.g., via photovoltaic panels 22), energy storage, energy transfer, or the like.

Inverter 118 is configured to convert direct current (DC) power to alternate current (AC) to operate one or more components within container 14. In a non-limiting example, inverter 118 is configured to be connected to one or more expansion valve coils of refrigeration unit 94. Converter 122 may be a DC/DC converter that is configured to convert the voltage of a current and may be used to connect low voltage components with high voltage components. In some configurations, converter 122 is configured to power one or more controllers (e.g., 30) used to run communications and software for energy distribution system 34.

In some configurations, MPPT device 130 can be connected to one or more photovoltaic panels 22. As a non-limiting example, each array of photovoltaic panels 22 disposed on a side of container may be connected to a separate MPPT device 130. The MPPT devices 130 can be configured to optimize solar harvest throughout the day. In some configurations, MPPT devices 130 include a controller for running an algorithm configured for extracting maximum available power from photovoltaic panels 22 depending on the conditions. As a non-limiting example, electricity from a first array of photovoltaic panels 22 is transferred to a first MPPT device (e.g., 130), which may then transfer the electricity to one or more other components (e.g., battery 26, inverter 118, converter 122, or the like). In some configurations, an output from MPPT device 130 is landed on a bus bar and then landed on battery 26.

Referring now to FIGS. 8A-8E, shown in another example of energy distribution system 34 that is disposed within a housing 134 that is positioned within base assembly 62. Energy distribution system 34 can include a distribution device 138, charging interface(s) 142, or both. Distribution device 138 or charging interface(s) 142 can interact with the one or more other components of distribution system 34 discussed herein to perform the described functions.

Distribution device 138 can be configured to distribute the power coming from photovoltaic panels 22, MPPT device 130, or other energy generation sources. In some configurations, distribution device 138 can include a DC distribution box, an AC distribution box, or combination thereof. As an illustrative, non-limiting example, DC distribution box may distribute electricity between inverter 118 and battery 26 and AC distribution box may receive electricity from the inverter 118 and distribute it to other components. Additionally, or alternatively, distribution device 138 can include bus bars, fuses, circuit breakers, or other devices to distribute power throughout energy distribution system 34.

Charging interface(s) 142 are configured to transfer power between battery 26 and an external power source (e.g., external battery, battery of a separate container, generator, or the like). In some configurations, charging interface 142 can be a wireless charging interface that is configured to operate bi-directionally, receiving and sending power. Charging interface 142 can be a wireless induction charger. In some such configurations, charging interface 142 may include a first set of components that are attached to container 14 and a second set of components that are attached to a base station of a ground or chassis module.

Figure 8A:
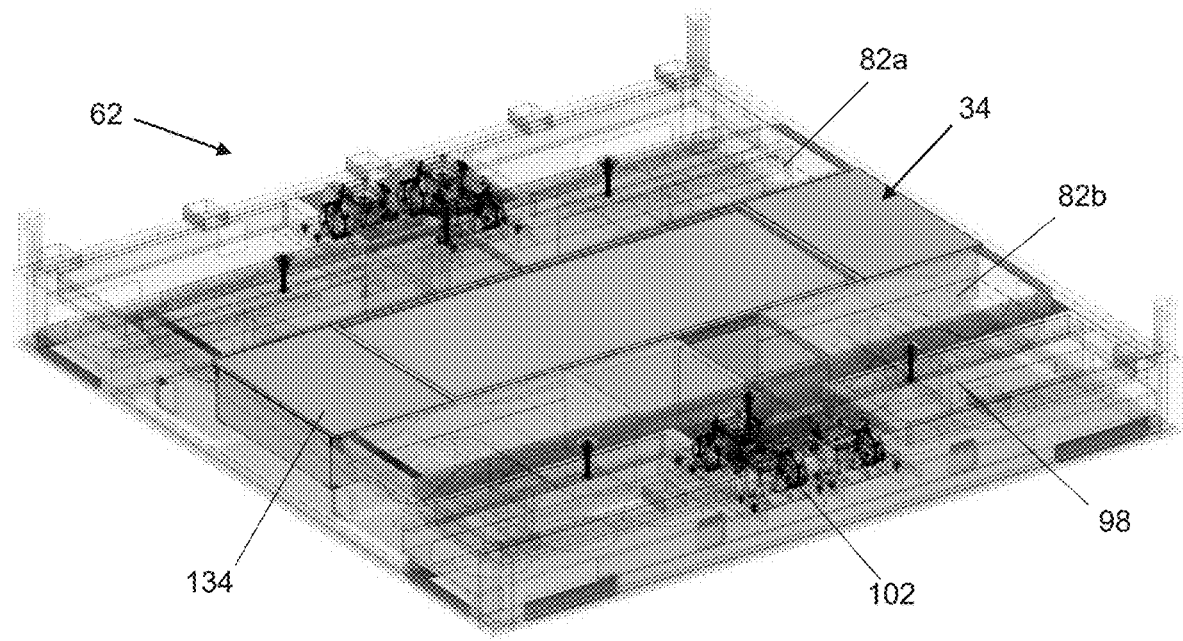
FIG. 8A shows a translucent perspective view of an example of a base assembly of a container of the present systems.
Figure 8B:
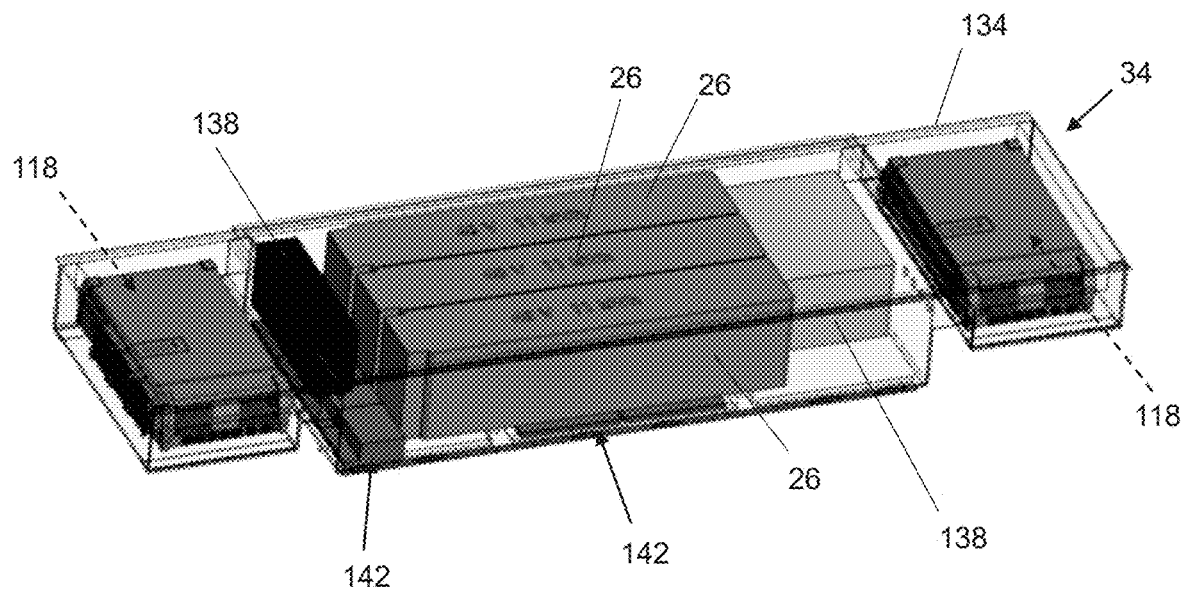
FIG. 8B shows a translucent perspective view of an example of an energy distribution system of FIG. 8A.
Figure 8C:
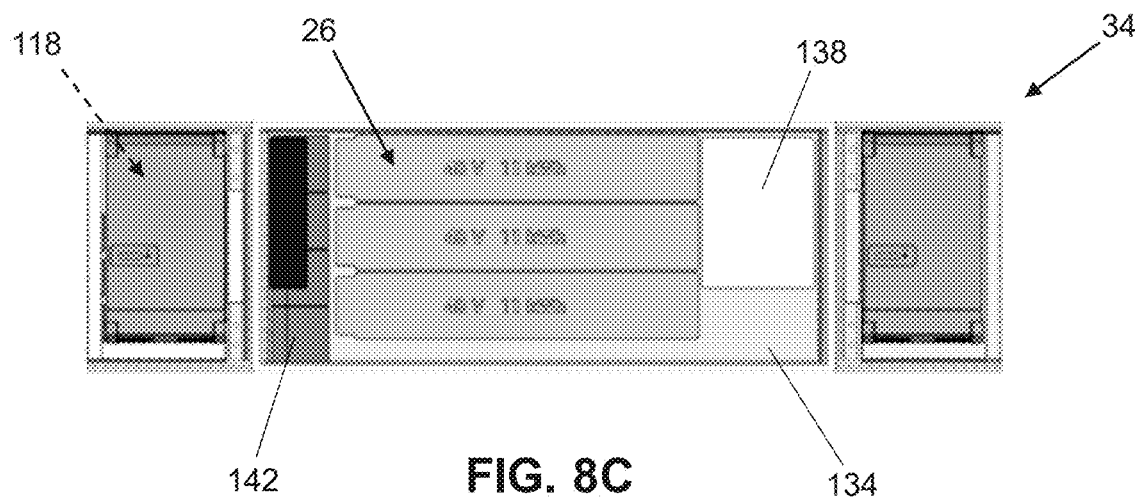
FIGS. 8C and 8D show a partial top view and a bottom view, respectively, of the energy distribution system of FIG. 8B.
Figure 8D:
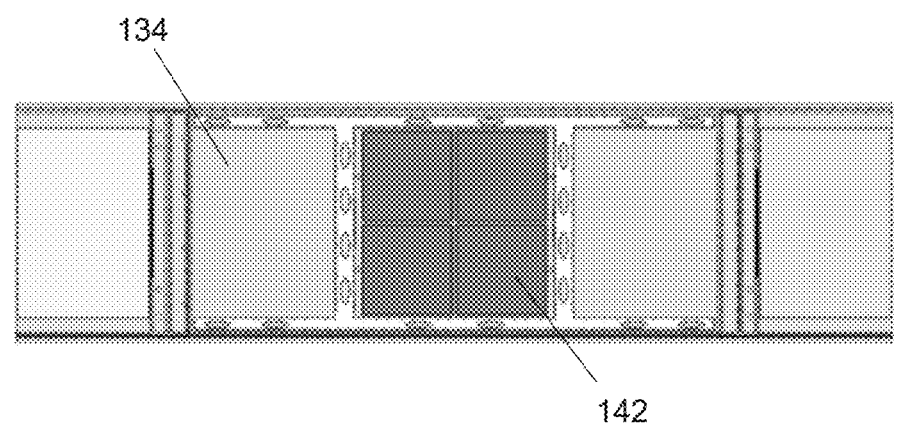
Figure 8E:
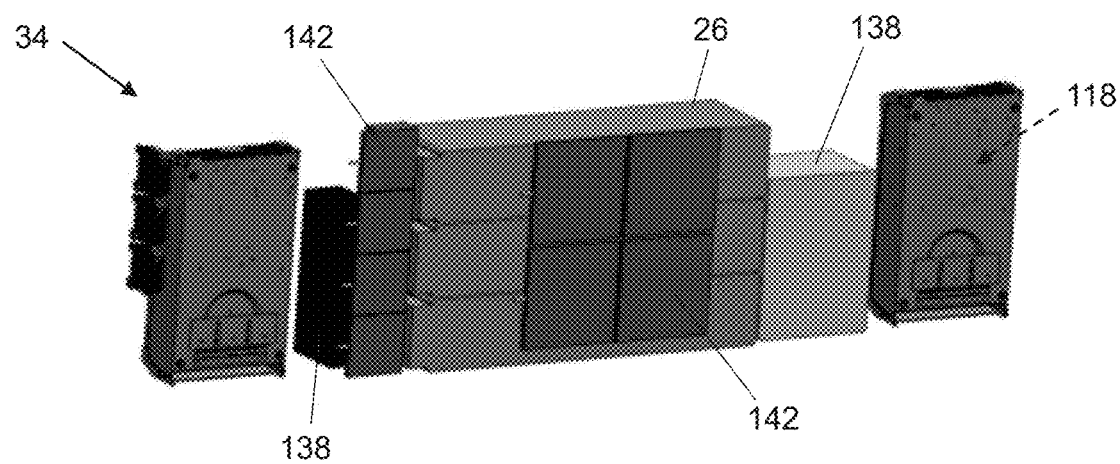
FIG. 8E shows another perspective view of the energy distribution system of FIG. 8B.

As shown in FIGS. 8B-8E, charging interface 142 can include a receiver pad (FIG. 8D) and a plurality of mobile charging units (FIG. 8C). The receiver pad can be configured to interact with a charging pad of a wireless charging base station to receive electricity from a base station. In some configurations, receiver pad can be located in a central area of container 14 such that the receiver pad will operate with a charging pad while container is positioned in any orientation. The electricity from receiver pad can be sent to battery 26 directly or via the mobile charging units. As shown in FIG. 8D, the receiver pad may be positioned on an external surface of housing 134; however, in other configurations the receiver pad may be at least partially within the housing.

It should be understood that the components depicted in the configurations shown in FIGS. 1-8E, above, are merely illustrative and can include or omit components depicted in other configurations. As such, the various illustrative configurations of the methods and systems are not intended to be limited to the particular forms disclosed. Rather, they include all modifications and alternatives falling within the scope of the claims, and configurations other than the one shown may include some or all of the features of the depicted configurations. To provide a specific example, components of sensors 74 and locking mechanisms 78, components of refrigeration unit 94, and components of energy distribution system 34 can be integrated into a single configuration.

Figure 9:
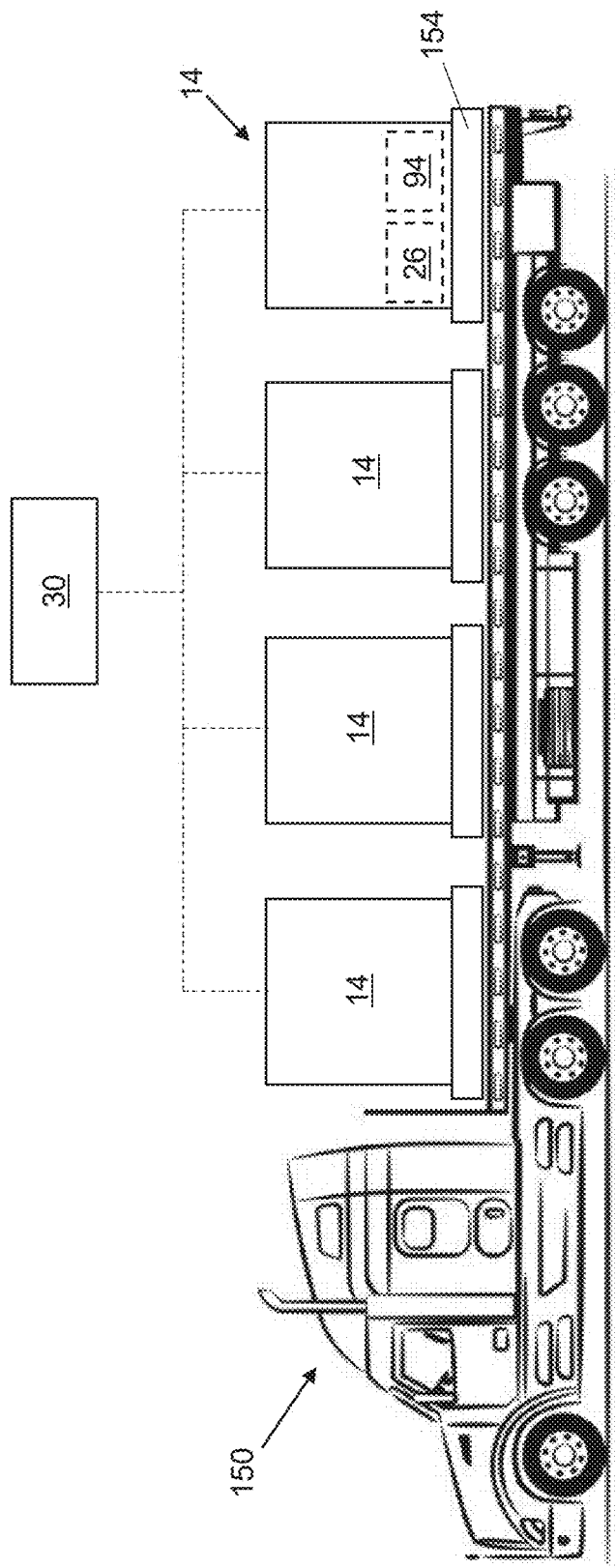
FIG. 9 shows coupled containers on a chassis

Referring now to FIG. 9 shown is an example of a configuration of system 10 disposed on a vehicle 150. Although vehicle 150 is depicted as a tractor trailer, the system can also be used with other vehicles, such as box trucks, multimodal container frames, straight trucks, boats, planes, trains, or other vehicles used for transportation. As depicted, four containers 14 are each disposed on a base station 154 that is disposed on vehicle 150; however, it should be understood that any number of containers may be included in system 10, such as any number greater than, equal to, or between any two of: 2, 3, 5, 10, 15, 20, 25, 30, 40, or 50 containers. Although depicted on vehicle 150, base station can be placed at other locations, such as a warehouse, lot, field, or the like. In some configurations, multiple base stations 154 can be coupled together to form a charging block that is placed at an intermediary storage location. For example, a charging block can be placed on vehicle 150 and at an intermediary location such that containers 14 can be powered during transit and also upon delivery. As described herein, each container 14 can be coupled to a respective base station (e.g., 154) in a plurality of orientations. For example, container 14 can be coupled to base stations 154 at different 90 degree orientations, such that the container can be placed on the base station in four different positions (each position being 90° from the other positions).

Each container 14 can be coupled to one or more other containers, electrical distribution system 34, or both, via an electrical connection such as a cable, busbar, wireless interface, or combination thereof. For example, each container 14 can be electrically connected to a wireless base station 154 that is configured to transmit and receive power to and from the electrical components (e.g., battery 26, photovoltaic panels 22, etc.) of the container. Each base station 154 may be in wired electrical connection with the one or more other base stations, an external battery, an external power generation source, or combination thereof. Controller 30 can be configured to modify, adjust, maintain, or otherwise control the flow of electricity (e.g., current, voltage, power, etc.) throughout system 10. In this way and others, system 10 can be configured to transfer power between containers 14 such that each container includes sufficient power to perform a relevant task (e.g., maintaining an air temperature within cavity 38 to be below a refrigerated threshold).

Container 14 can include electrical equipment that are sufficient to power and cool the cargo being transported. To illustrate, photovoltaic panels 22 can be configured to generate peak power that is greater than or equal to substantially 500, 1000, 1500, or 2000 watts (W). Additionally, or alternatively, battery 26 can provide greater than or equal to substantially 25, 30, 40, 50, 60, 70 or 75 volts and, in some configurations, can have a capacity that is greater than or equal to substantially 15, 20, 25, 30, 35, 40, 45, or 50 Kilowatt-hours (KWh). In some systems 10. Battery 26 can be any suitable rechargeable battery, such as a lead-acid battery, Nickel-Cadmium battery, Nickel-Metal Hydride battery, Lithium-Ion (or Lithium-Ion Polymer) battery, Nickel-Zinc, or the like. In some of the described configurations, charging interface(s) 142 can operate at greater than or equal to substantially 10, 12, 14, 16, 18, 20, or 25 kilowatts (KW). In some configurations, container 14 can include a refrigeration unit 94 that includes a cooling capacity of greater than or equal to substantially 2, 4, 6, 8, or 10 KW and, in some configurations, can be configured to extract greater than or equal to substantially 3,000, 4,000, 5,000, 6,000, 8,000, 10,000, 12,000, 15,000, 30,000, 60,000, or 90,000 BTUs of heat energy an hour from cavity 38.

In a non-limiting specific example, container 14 can include an array of solar panels (e.g., 22) on three sides of the container, where each side includes substantially 1,100 watts (W) of peak power. The panels may be connected to a substantially 48 Volt (V) DC battery system (e.g., 26) that has a substantially 33 kilowatt-hour (kWh) capacity and includes a plurality of Lithium Ferrous Phosphate battery cells. The battery system may be connected to a substantially 11 kW wireless charging interface (e.g., 142) having a receiving interface located on the container and a ground interface (e.g., 154) located on an external surface. The refrigeration system (e.g., 94) within container 14 can include six 4 KW scroll compressors 102, with three of the compressors running an independent refrigeration circuit to cool cavity 38 of container. The container 14 can be configured to be placed on vehicle 150 and utilized to pre-cool, store produce, such as fruits and vegetables, during transportation from a field after harvest and the refrigeration system (e.g., 94) can maintain the temperature of the produce within a selected range. Renewable power may be distributed between containers 14 to ensure each container has sufficient power to maintain the temperature within the selected range.

Figure 10A:
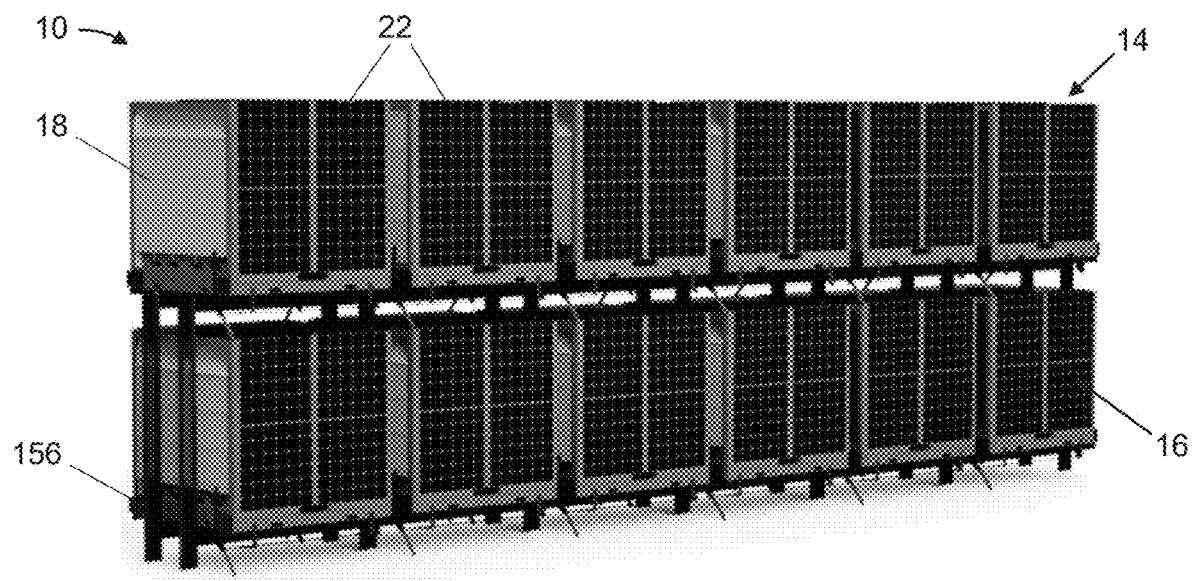
FIGS. 10A and 10B show perspective views of examples of a system according to an embodiment of the present disclosure.
Figure 10B:
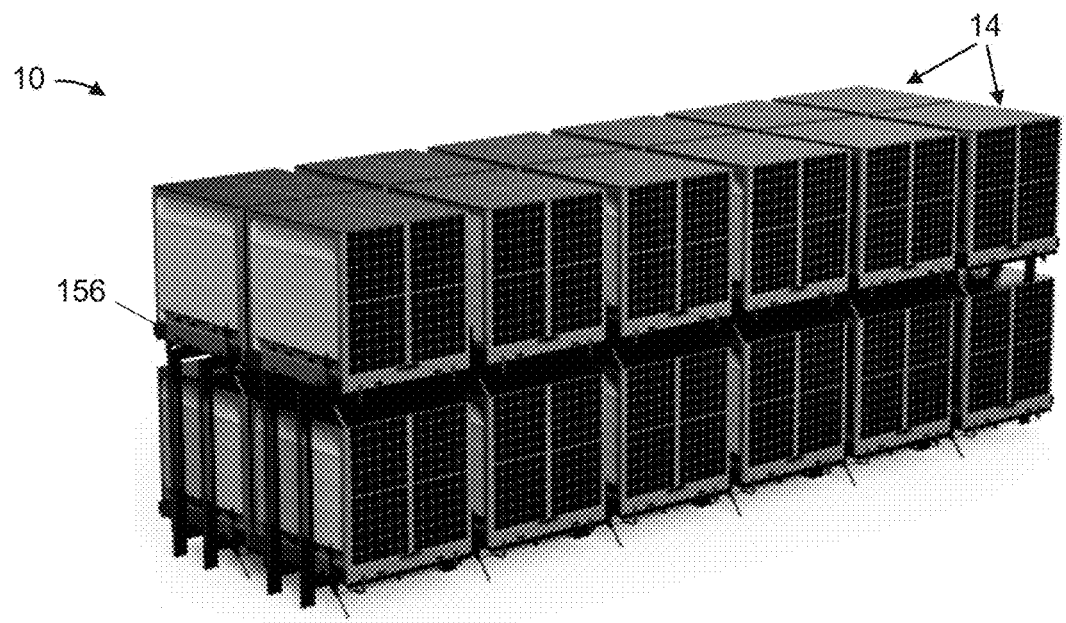

FIGS. 10A and 10B show additional examples of configurations of system 10 that include a plurality of containers 14. As shown, each container 14 can be mounted to a support structure 156. In some configurations, support structure 156 can be configured to support containers in a multi-tiered layout. For example, FIGS. 10A and 10B show a two-tiered configuration in which containers 14 can sit on a rack, one above the other. This allows for the bottom cube to be placed/removed without having to move the top cube. Support structure 156 can include or incorporate features of base station 154, as discussed above, to transmit and receive electricity between containers 14. For example, support structure 156 can include a busbar that is configured to transfer power between containers 14. Support structure 156 can be configured to be positioned on a vehicle (e.g. 150) or on the ground, such as in a warehouse, lot, or other structure. Containers 14 can be coupled to support structure in a plurality of orientations, such as four different 90° orientations.

Figure 11:
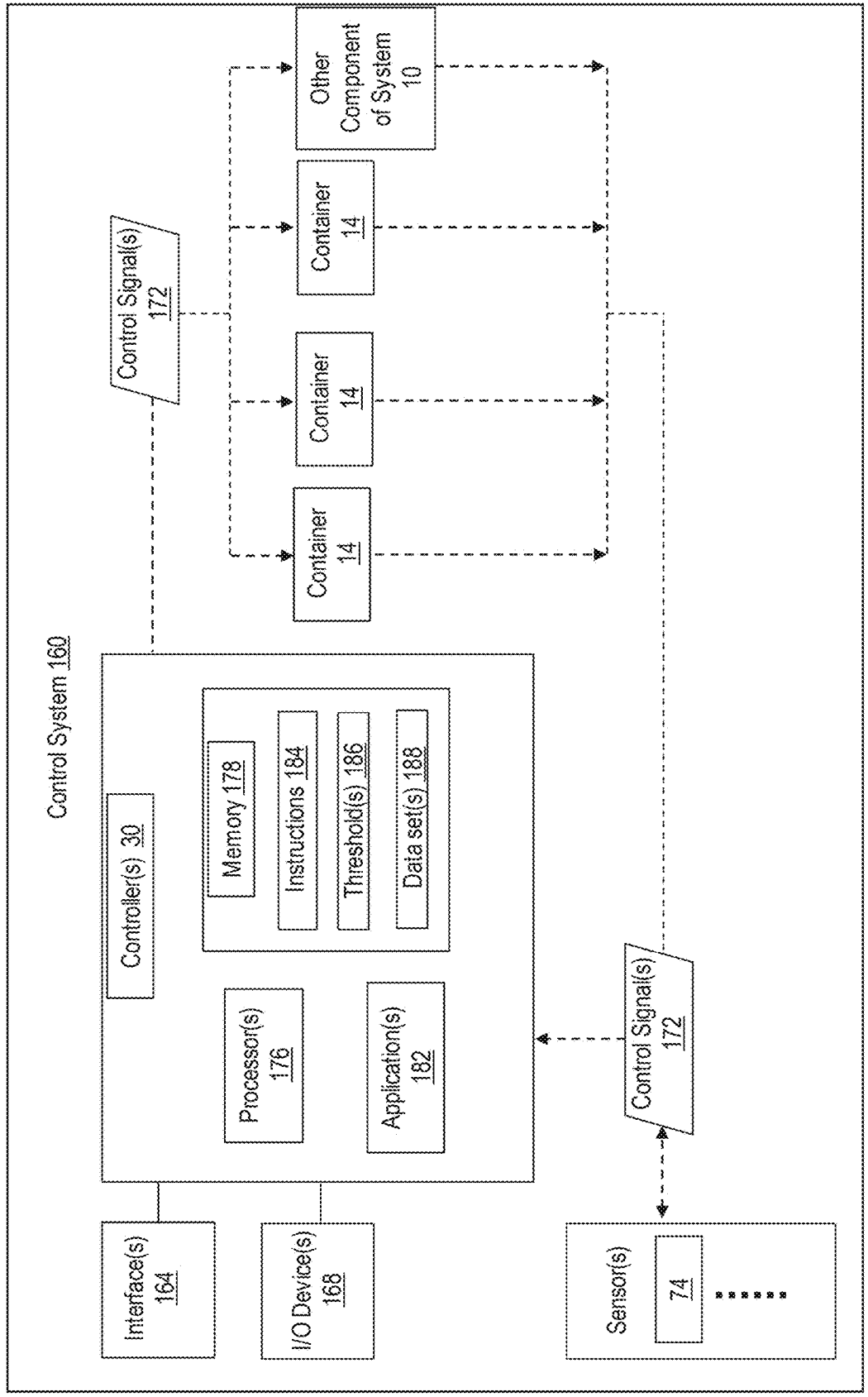
FIG. 11 shows a schematic operational diagram of one embodiment of the present systems.

FIG. 11 illustrates a schematic of a control system for system 10 referred to generally as a control system 160. As depicted, control system 160 can include controller 30 which is configured to control one or more operations of system 10, such as, but not limited to, operation of the flow of electricity between containers 14, the operation of photovoltaic panels 22, a selected temperature of cavity 38 of the container, the operation or energy flow between other external energy generation sources or storage sources, or combination thereof. In the depicted configuration, control system 160 may comprise one or more interface(s) 164 or one or more I/O device(s) 168 coupled to controller 30.

System 10 can include one or more sensor(s) configured to detect one or more parameters and to provide data to controller 30 (e.g., via control signal 172). Each component of control system 160 can be in signal communication with one or more other components of the control system, which can be a wired connection or a wireless connection. In some configurations, circuitry (e.g., a PCB, wires, etc.) may connect components of control system 160 with one or more other components of system 10. Additionally, or alternatively, components of control system 160 may be in wireless communication with one or more other components of system 10 such as, for example, via be Wi-Fi®, Bluetooth®, ZigBee, or forms of near field communications. In some configurations, components may be in signal communication via one or more intermediate controllers or relays that are in signal communication with one another. For example, a controller of a first container (e.g., 14) may be in direct electrical communication with refrigeration unit 94 of that first container, electrical distribution system 34 of that first container, sensors 74 or locking mechanisms 78 of that first container, a controller of a second container (e.g., 14), or combination thereof.

Controller 30 may include a processor 176 coupled to a memory 178 (e.g., a computer-readable storage device). In some configurations, controller 30 may include one or more application(s) 182 that access processor 176 and/or memory 178 to perform one or more operations of system 10. Processor 176 may include or correspond to a microcontroller/microprocessor, a central processing unit (CPU), a field-programmable gate array (FPGA) device, an application-specific integrated circuits (ASIC), another hardware device, a firmware device, or any combination thereof. Memory 178, such as a non-transitory computer-readable storage medium, may include volatile memory devices (e.g., random access memory (RAM) devices), nonvolatile memory devices (e.g., read only memory (ROM) devices, programmable read-only memory, and flash memory), or both. Memory 178 may be configured to store instructions 184, one or more thresholds 186, one or more data sets 188, or combination thereof. In some configurations, instructions 184 (e.g., control logic) may be configured to, when executed by the one or more processors 176, cause the processor(s) to perform one or more operations (e.g., send or receive electricity, adjust a temperature, actuate a locking mechanism, or the like). The one or more thresholds 186 and one or more data sets 188 may be configured to cause the processor(s) to generate control signals (e.g., 172). For example, the processor(s) 176 may initiate and/or perform operations as described herein. As a specific example, thresholds can include a minimum power level, a maximum power level, a temperature, a carbon dioxide level, a humidity, or other thresholds. Data sets 188 can include data associated with thresholds or other parameters of system 10, such as, operational data, maintenance data, equipment set up, equipment alarm history, equipment health ratings, food safety data or food traceability rule data, or the like.

Application(s) 182 may communicate (e.g., send and/or receive) with processor 176 and memory 178. For example, application(s) 182 may receive data from sensor(s) or memory 178 (e.g., data sets 188), manipulate or organize the data, and send a signal to processor 176 to cause the processor to output the data (e.g., via interface 164 or I/O device 168) or store the data (e.g., via memory 178). In some configurations, application(s) 182 comprises COMSOL, ABAQUS, ImageJ, Matlab, Solidworks, AutoCAD, ANSYS, LabView, CATIA, OpenFoam, HFSS, Mathcad, combination thereof, or the like. In some configurations, controller 30 is configured to generate and send control signals 172. For example, controller 30 may generate and/or send control signals 172 responsive to receiving a signal and/or one or more user inputs via the one or more interfaces 164 and/or the one or more I/O devices 168. Additionally, or alternatively, controller may generate and/or send control signals 172 responsive to one or more of instructions 184, thresholds 186, or data sets 188, or receiving a control signal from one or more components of system 10.

Interfaces 164 may include a network interface and/or a device interface configured to be communicatively coupled to one or more other devices. For example, interfaces 164 may include a transmitter, a receiver, or a combination thereof (e.g., a transceiver), and may enable wired communication, wireless communication, or a combination thereof, such as with I/O device 168. The I/O device(s) 168 may include a touchscreen, a display device, a light emitting diode (LED), a speaker, a microphone, a camera, keyboard, computer mouse, another I/O device, or any combination thereof, as illustrative, non-limiting examples. In some configurations, interfaces(s) 164 and/or I/O device(s) 168 may enable a wired connection to controller 100 via a port or other suitable configuration.

The controller 30 may be in signal communication with container 14 to control the delivery of electricity to electrical distribution system 34 and control a temperature within cavity 38 of the container. For example, controller 30 can determine a cooling threshold (e.g., a required cooling load capacity) of a container 14 and control the electricity to electrical distribution system 34 such that the container may operate at or above the cooling threshold. In some configurations, the controller 30 may be in signal communication with sensors disposed about container 14. For example, container 14 can include a temperature sensor, humidity sensor, gas sensors (e.g., carbon dioxide sensor, oxygen sensor, ethylene gas sensor) power level sensor, current sensor, voltage sensor, battery sensor, or the like. For example, container 14 can measure an output from each array of photovoltaic panel 22, a temperature, humidity, or gas level (e.g., an amount of off gases from produce) within cavity 38, a power level of battery 26, a temperature of the components within energy distribution system 34, or the like. Controller 30 can store these measurements or perform one or more functions based on the detected measurements. For example, controller 30 can store a digital log of the level or amount of gases within cavity and determine how produce degrades based on the associated levels of different gases during the process. In some such examples, controller 30 can perform one or more functions based on the gas measurements, such as ventilate the air within the cavity, various onboard gases to control and/or modify the entire atmosphere of the container, adjust a temperature, adjust a humidity, or the like.

In some configurations, instructions 184 (e.g., control logic) may be configured to, when executed by the one or more processors 176, cause the processor(s) to perform one or more operations. For example, the one or more operations may include receiving a message (e.g., control signal 172, a command, or an instruction) to perform an operation and identifying the requested operation. To illustrate, the operation may include controlling the flow of electricity between individual containers 14. For example, the operation may include determining that a power level of battery 26 of a first container (e.g., 14) is less than or equal to a minimum power threshold and, based on this determination, transmitting power to the battery of the first container. Additionally, or alternatively, the operation may include determining that a power level of battery 26 of a first container (e.g., 14) is greater than or equal to a maximum power threshold and, based on this determination, transmitting power to from the battery of the first container. In some configurations, power can be transferred between the battery and a battery of another container (or multiple batteries of multiple other containers), an external battery of system 10, a power generation source of the system, an electrical grid, or the like.

The above specification and examples provide a complete description of the structure and use of illustrative configurations. Although certain configurations have been described above with a certain degree of particularity, or with reference to one or more individual configurations, those skilled in the art could make numerous alterations to the disclosed configurations without departing from the scope of this invention. As such, the various illustrative configurations of the methods and systems are not intended to be limited to the particular forms disclosed. Rather, they include all modifications and alternatives falling within the scope of the claims, and configurations other than the one shown may include some or all of the features of the depicted configurations. For example, elements may be omitted or combined as a unitary structure, connections may be substituted, or both. Further, where appropriate, aspects of any of the examples described above may be combined with aspects of any of the other examples described to form further examples having comparable or different properties and/or functions and addressing the same or different problems. Similarly, it will be understood that the benefits and advantages described above may relate to one configuration or may relate to several configurations. Accordingly, no single implementation described herein should be construed as limiting and implementations of the disclosure may be suitably combined without departing from the teachings of the disclosure.

The previous description of the disclosed implementations is provided to enable a person skilled in the art to make or use the disclosed implementations. Various modifications to these implementations will be readily apparent to those skilled in the art, and the principles defined herein may be applied to other implementations without departing from the scope of the disclosure. Thus, the present disclosure is not intended to be limited to the implementations shown herein but is to be accorded the widest scope possible consistent with the principles and novel features as defined by the following claims. The claims are not intended to include, and should not be interpreted to include, means-plus-or step-plus-function limitations, unless such a limitation is explicitly recited in a given claim using the phrase(s) "means for" or "step for," respectively.

The invention claimed is:

1. A system for pre-cooling and transporting goods, the system comprising:
    a refrigerated container defining a cavity configured to store goods for transport;
    a plurality of photovoltaic panels coupled to an outer surface of the container;
    one or more batteries configured to receive electrical power from the plurality of photovoltaic panels;
    an energy distribution system connected to the one or more batteries and a first energy source, the energy distribution system includes a controller configured to:
        based on a power level of the one or more batteries being less than or equal to a first threshold, transfer power from the first energy source to the one or more batteries; and
        based on a power level of the first energy source being less than or equal to a second threshold, transfer power from the one or more batteries to the first energy source.

2. The system of claim 1, wherein the first energy source includes a second container defining a cavity configured to store goods for transport, the second container having:
    a plurality of photovoltaic panels coupled to at least a first side and a second side of an outer surface of the second container; and
    one or more batteries configured to receive electrical power from the plurality of photovoltaic panels of the second container.

3. The system of claim 2, wherein the energy distribution system includes a generator configured to generate power, the generator connected to the one or more batteries and the first energy source.

4. The system of claim 1, wherein the energy distribution system is configured to transfer power to the one or more batteries via induction.

5. The system of claim 4, wherein:
    the container includes a power transfer system coupled to a bottom side of the container;
    the energy distribution system includes a base configured to receive the container such that when the bottom side of the container is coupled to the base the energy distribution system is configured to wirelessly charge the one or more batteries; and
    the base is configured to be disposed on a chassis of a vehicle or stationary structure; and
    the base is configured to couple to the vehicle or stationary structure in multiple different orientations.

6. The system of claim 1, further comprising a refrigerator configured to cool the cavity, the refrigerator configured to receive power from the one or more batteries.

7. The system of claim 6, wherein the refrigerator includes a first duct disposed underneath a floor of the container, the first duct defining a passage extending between a first opening positioned adjacent to a first wall of the container and a second opening positioned adjacent to a second wall of the container.

8. The system of claim 7, wherein the refrigerator includes a second duct disposed underneath the floor of the container, the second duct defining a passage extending between a first opening positioned adjacent to the first wall of the container and a second opening positioned adjacent to the second wall of the container.

9. The system of claim 8, wherein the refrigerator includes:
    a first fan disposed in the first duct and configured to transport cold air into the cavity via the first and second openings of the first duct; and
    a second fan disposed in the second duct and configured to transport cold air into the cavity via the first and second openings of the second duct.

10. The system of claim 9, wherein the first and second fans are bi-directional fans.

11. The system of claim 6, wherein a width of the container and a length of the container is between 96 and 102 inches.

12. The system of claim 11, wherein the container includes:
    a first wall and a second wall;
    a first slidable door covering a first doorway defined by a first side of the container; and
    a second slidable door covering a second doorway defined by a second side of the container.

13. The system of claim 12, wherein the container includes a first door track coupled to the first wall, the first slidable door configured to traverse the first door track to move between:
- an open position in which the cavity is accessible via the first doorway; and
- a closed position.

14. The system of claim 13, wherein:
- the first door track includes a first portion extending in a direction that is substantially parallel to a roof of the container and a second portion extending in a direction that is substantially parallel to the first wall;
- when in the open position, the first slidable door is disposed on the first portion of the first door track; and
- when in the closed position, the first slidable door is disposed on the second portion of the first door track; and
- the first and second slidable doors can be positioned in the closed position simultaneously such that both the first and second doorways can be accessible at the same time.

15. The system of claim 6, wherein the container includes a sensor configured to detect carbon dioxide, oxygen and ethylene gas levels and, based on the carbon dioxide, oxygen and ethylene gas levels being above a first threshold, actuating a gas source to transfer a gas into or out of the cavity.

16. A system for transporting goods, the system comprising:
- a plurality of refrigerated containers, each container defining a cavity configured to pre-cool produce and store goods for transport and including:
  - a plurality of photovoltaic panels coupled to an outer surface of the container;
  - a battery configured to receive electrical power from the plurality of photovoltaic panels;
  - a refrigerator configured to cool the cavity; and
- an energy distribution system connected to the plurality of refrigerated containers and configured to:
  - determine a power level of the batteries for each container;
  - determine a required cooling load capacity; and based on the power level of the battery and required cooling load capacity of a first container of the plurality of refrigerated containers being below a first threshold, transfer power to the battery of a first container from at least one of the batteries of the other plurality of refrigerated containers.

17. The system of claim 16, wherein the energy distribution system includes a power grid configured to receive and transfer power to each battery of the plurality of refrigerated containers.

18. The system of claim 17, wherein the energy distribution system is configured to:
- transfer power from the battery of a second container of the plurality of refrigerated containers to the power grid based on the power level of the battery of the second container being above a second threshold; and
- transfer power from the power grid to the battery of a third container of the plurality of refrigerated containers based on the power level of the battery of the third container being below the first threshold.

19. The system of claim 17, wherein the energy distribution system is configured to:
- operate the plurality of refrigerated containers in a first mode in which energy generated by the plurality of photovoltaic panels is transferred to the battery of a respective container of the plurality of refrigerated containers; and
- operate the plurality of refrigerated containers in a second mode in which energy generated by the plurality of photovoltaic panels is transferred to the power grid; and
- based on the power level of the battery of a first container being above a second threshold, switching operation of the first container from the first mode to the second mode.

20. The system of claim 17, wherein the energy distribution system includes a generator connected to the power grid and configured to generate electrical energy.

* * * * *